(12) United States Patent
Nabi et al.

(10) Patent No.: US 10,795,054 B2
(45) Date of Patent: Oct. 6, 2020

(54) SYSTEM AND METHOD FOR SENSING WIND FLOW PASSING OVER COMPLEX TERRAIN

(71) Applicant: Mitsubishi Electric Research Laboratories, Inc., Cambridge, MA (US)

(72) Inventors: Saleh Nabi, Arlington, MA (US); Piyush Grover, Cambridge, MA (US); Mithu Debnath, Dallas, TX (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 379 days.

(21) Appl. No.: 15/926,864

(22) Filed: Mar. 20, 2018

(65) Prior Publication Data

US 2019/0293836 A1 Sep. 26, 2019

(51) Int. Cl.
*G01W 1/00* (2006.01)
*G01V 3/38* (2006.01)
(Continued)

(52) U.S. Cl.
CPC ............... *G01W 1/00* (2013.01); *G01P 5/001* (2013.01); *G01P 5/26* (2013.01); *G01S 7/4808* (2013.01); *G01S 17/95* (2013.01); *G01S 17/58* (2013.01)

(58) Field of Classification Search
CPC ....................................................... G01W 1/00
(Continued)

(56) References Cited

U.S. PATENT DOCUMENTS

| 4,735,503 A | 4/1988 | Werner et al. |
| 2010/0276940 A1* | 11/2010 | Khavari ................. F03D 3/005 290/55 |

(Continued)

FOREIGN PATENT DOCUMENTS

DE 102014216368 A1 2/2016

OTHER PUBLICATIONS

Kim et al., "Correction of LIDAR Measurement error in Complex Terrain by CFD Case Study of the Yangyang Pumped Storage Plant." Wind Engineering., vol. 41, No. 4, Aug. 1, 2017. pp. 226-234.

(Continued)

*Primary Examiner* — Aditya S Bhat
(74) *Attorney, Agent, or Firm* — Gennadiy Vinokur; James McAleenan; Hironori Tsukamoto

(57) ABSTRACT

A wind flow sensing system determines a first approximation of the velocity field at each of the altitudes by simulating computational fluid dynamics (CFD) of the wind flow with operating parameters reducing a cost function of a weighted combination of errors, determines a horizontal derivative of vertical velocity at each of the altitudes from the first approximation of the velocity fields, and determines a second approximation of the velocity fields using geometric relationships between a velocity field for each of the altitudes, projections of the measurements of radial velocities on the three-dimensional axes, and the horizontal derivative of vertical velocity for the corresponding velocity field. In the cost function of the CFD, each error corresponds to one of the altitudes and includes a difference between measured velocities at the line-of-site points at the corresponding altitude and simulated velocities at the line-of-site points simulated by the CFD for the corresponding altitude.

(Continued)

At least some errors in the weighted combination have different weights.

20 Claims, 16 Drawing Sheets

(51) Int. Cl.
*G01S 17/95* (2006.01)
*G01P 5/26* (2006.01)
*G01S 7/48* (2006.01)
*G01P 5/00* (2006.01)
*G01S 17/58* (2006.01)

(58) Field of Classification Search
USPC .......................................................... 702/3, 5
See application file for complete search history.

(56) References Cited

U.S. PATENT DOCUMENTS

2013/0028228 A1  1/2013  Nakayama et al.
2014/0028496 A1*  1/2014  Schroeder ............... G01S 13/87
                                                                342/26 R

OTHER PUBLICATIONS

Bowuet et al., "Combination of Wind Lidar with CFD tools for improving measurements in complex terrain," Mar. 1, 2010, pp. 1-4. Retrieved https://www.researchgate.net/profile/Remy_Parmentier/Publication/268291799_Combination_of_wind_Lidar_with_CFD_tools_for_improving_measurements_in_complex_terrain/links.orf, retrieved Jan. 24, 2019.

* cited by examiner

SYSTEM AND METHOD FOR SENSING WIND FLOW PASSING OVER COMPLEX TERRAIN

TECHNICAL FIELD

This invention relates generally to remote sensing, and more specifically to sensing a flow of wind passing over complex terrain.

BACKGROUND

Measurement of the movements of the atmosphere or of the wind is of importance for many applications, in particular in meteorology and for the monitoring and characterization of sites such as airports and wind farms. It is often useful to measure the displacement of air masses over a wide range of altitudes or in a zone corresponding to an extensive volume. The sensing of such a displacement of an extensive volume can be impractical to perform with anemometers such as cup anemometers, and requires remote sensing instruments, capable of taking remote measurements. These instruments in particular include radar, LiDAR and SODAR. Radar and LiDAR systems use electromagnetic waves, in hyperfrequency and optical frequency ranges respectively. SODAR systems use acoustic waves.

For example, measurements of the movement of air masses with such instruments are generally carried out as follows. The apparatus transmits one or more beams of waves (acoustic and/or electromagnetic) along transmission axes in the zones to be measured, continuously or as pulses. The transmissions along the different transmission axes can be simultaneous or sequential. The beams are subjected to scattering effects in the atmosphere, due in particular to the inhomogeneities encountered (aerosols, particles, variations in refractive indices for electromagnetic waves or in acoustic impedance for acoustic waves). When they are scattered in air masses or moving particles, these beams of waves also undergo a frequency shift by the Doppler effect.

The backscattered beams are detected by one or more receivers oriented according to measurement axes. These receivers detect the waves scattered by the atmosphere in their direction along their measurement axis. The distance along the measurement axis of the detectors at which scattering occurred can then be calculated, for example by a method of measuring the time of flight, or a method of phase shift measurement by interferometry. The radial velocity of the air masses or particles along the measurement axis can also be obtained by measuring the frequency shift of the wave by the Doppler effect. This measured radial velocity corresponds to the projection of the velocity vector of the scattering site on the measurement axis of the detector.

Remote sensing instruments, including in particular LiDAR systems suitable for measuring the characteristics of the wind in the lower layers of the atmosphere, are often of the monostatic type. This signifies that the same optics or the same antenna (acoustic or electromagnetic) are used for transmission and for reception of the signal. The volume probed is generally distributed along a cone with its apex located at the level of the optics or of the antenna of the instrument. Each beam of pulses of the instrument along the cone measures the radial velocity of movement of the particles along a measurement axis that coincides with the transmission axis. Measures are thus obtained of the radial velocity of the wind, representative of the projection of the wind vector on the beam propagation axis.

The wind vector, i.e., a velocity field, throughout all the volume of interest is then calculated, on the basis of the measurements of radial velocity of the wind. In existing devices, this calculation is generally carried out using purely geometric models. These models have the drawback that they are based on a hypothesis that is sometimes rather unrealistic, in particular spatial and temporal homogeneity of the wind for the whole duration of measurement of the sample. According to this hypothesis, at a given altitude the wind vector is identical at every point of the atmosphere probed by the instrument.

Using the spatial and temporal homogeneity of the wind, some methods calculate the components of the wind vector at a given altitude from at least three measures of radial velocities measured at one and the same altitude in at least three different directions, by solving a system of at least three equations with three unknowns that describes the geometric relationship between the wind vector and its projections along the axes of measurements constituted by the measurements of radial velocities. An example of a method using geometric calculation is a "Velocity Azimuth Display" (VAD) method, see, e.g., U.S. Pat. No. 4,735,503. However, this method is based on the same hypotheses of spatial homogeneity of the wind at a given altitude.

The atmospheric remote sensing instruments for wind measurement using geometric techniques for reconstruction of the wind vector allow accurate measurement of the average velocity of the wind when the measurement is carried out above essentially flat terrain (terrain with very little or no undulation, or offshore). For example, with LiDAR systems, relative errors obtained for measures averaged over 10 minutes are under 2% relative to the reference constituted by calibrated cup anemometers.

On the other hand, the accuracy of determination of the horizontal and vertical velocity deteriorates considerably when the measurement is carried out above more complex terrains such as undulating or mountainous terrains, terrains covered with forest, etc. A relative error for average values calculated over 10 minutes of the order of 5% to 10% was observed on complex sites, for measurements carried out with these same LiDAR systems and relative to a calibrated cup anemometer.

The current telemetry devices implementing geometric models therefore do not allow sufficiently accurate measurement of horizontal and/or vertical velocity and direction of the wind over complex terrain. In fact, over the complex terrains, the wind can no longer be considered as homogeneous at a given altitude in the volume of atmosphere probed by the instrument. However, accurate measurements of the characteristics of the wind are useful under these conditions, in particular in the context of the development of wind farms.

Some methods, e.g., US 2013/0282285, propose the use several different fidelity numerical models along with optimization method to match the flow velocities measured by LiDAR. However, the determination of the conditions justifying the correctness of those models remains a difficult issue.

Accordingly, there is still a need for a system and method suitable for sensing wind flow passing over complex terrain.

SUMMARY

Some embodiments are based on recognition that a remote sensing system, such as a LiDAR, measures the radial velocity of prevailing wind in the line of sight (LOS) direction and estimate the 3D wind velocity field faces a number of challenges. For example, a remote sensing system using a single ground-based LiDAR scanning in a conic pattern suffers from the so-called "Cyclops-dilemma" This phenomenon refers to the fact that exact reconstruction of an arbitrary 3D velocity field cannot be performed using a single LOS measurement. This problem can be addressed, at least in part, by an assumption that the velocity is homogeneous and/or constant on each horizontal plane inside the cone of measurements. In other words, the velocity only changes as one moves in the vertical direction. This homogeneous velocity assumption allows for computation of an "average" horizontal and vertical velocity at each horizontal plane using geometrical relationship between the velocity field and the projections of the measured radial velocities on the velocity field.

The homogeneous velocity assumption is often quite accurate on flat terrains away from wind-turbines, buildings and above a certain height in dense forest. However, this homogeneous velocity assumption can be violated for the wind flow over complex terrain such as hills, or near large building or other urban structures.

Some embodiments are based on recognition that the homogeneous velocity assumption in sensing wind flow passing over the complex terrain can be corrected using a horizontal derivative of vertical velocity. This horizontal derivative of vertical velocity can show a change in direction and/or the magnitude of the vertical velocity at a given altitude. Even the first derivative showing the linear change of the vertical velocity can be used to improve accuracy of the wind flow sensing, because the homogeneous velocity assumption causes the leading order terms in the error of the sensed velocity fields.

Some embodiments are based on recognition that the bias of the horizontal derivative of vertical velocity that appears in the homogenous assumption may not be removed by enforcing incompressibility alone on the reconstructed velocity field of the wind flowing over the complex terrains. Specifically, it is tempting to impose physical properties of the wind flow, such as incompressibility of the air, on the wind flow reconstruction. However, some embodiments are based on realization that a mathematical structure of the errors caused by the homogenous velocity assumption can prevent to reduce the leading order terms by forcing incompressibility condition on the volume of fluid inside the domain of interest.

Computational fluid dynamics (CFD) is a branch of fluid mechanics that uses numerical analysis and data structures to solve and analyze problems that involve fluid flows. Computers are used to perform the calculations required to simulate the interaction of liquids and gases with surfaces defined by boundary conditions. Some embodiments are based on general understanding that CFD can be used to estimate the velocity fields of the wind from the measurements of the wind on a cone sensed by the LiDAR. However, the operating parameters, such as boundary conditions, for the wind flow over the complex terrains are usually unknown, and the approximation of those operating parameters can undesirably reduce the accuracy of the wind flow sensing.

Some embodiments are based on realization that while a CFD approximation maybe not accurate enough for the determination of the velocity field, the CFD approximation can be accurate enough for an average of the horizontal derivative of vertical velocity reconstruction at a given altitude, which, in turn can be used for correcting the bias due to the homogenous velocity assumption. To that end, some embodiments use the CFD approximation to determine the horizontal derivative of vertical velocity and use the horizontal derivative of vertical velocity in combination with the radial velocity measurements of the wind flow on the desired altitudes to determine the velocity field for the desired altitudes. In such a manner, a target accuracy of the velocity field sensing using the radial velocity measurements can be achieved.

To that end, some embodiments use a simulation of computational fluid dynamics (CFD) of the wind flow to produce a first approximation of the velocity fields. However, instead of using this first approximation of the velocity fields as a final result, the embodiments determine a horizontal derivative of vertical velocity at each of the altitudes from the first approximation of the velocity fields and determine a second approximation of the velocity fields using geometric relationships between a velocity field for each of the altitudes, projections of the measurements of radial velocities on the three-dimensional axes, and the horizontal derivative of vertical velocity for the corresponding velocity field. In a number of experiments and test, various embodiments demonstrate that the second approximation of the velocity fields determined by removing bias of the homogeneous velocity assumption is more accurate than the first approximation of the velocity fields determined using the CFD of the wind flow.

Some embodiments are based on realization that when the CFD is used for the purpose of the horizontal derivative of vertical velocity reconstruction, a particular set of operating parameters needs to be approximated. These operating parameters can be selected based on effect of such parameters on the ultimate quantities of interest i.e., horizontal derivative of vertical velocity. In such a manner, the accuracy of the quantity of interest, i.e., horizontal derivative of vertical velocity, can be improved.

For example, some embodiments select the operating parameters based on the sensitivity of the horizontal derivative of vertical velocity to the variations in the values of these operating parameters. In one embodiment, the operating parameters with the sensitivity above a threshold is selected in the purpose-based set of operating parameters approximated during CFD simulation.

For example, some embodiments select the operating parameters such as terrain roughness, inlet mean velocity, inlet turbulence intensities, and atmospheric stability conditions for determining the horizontal derivative of vertical velocity.

In such a manner, some embodiments adapt the unknown operating parameters of the CFD to the purpose of the CFD approximation. Such an adaptation of the operating parameters reduces the computational burden without reducing the accuracy of CFD approximation of quantities of interest.

Some embodiments are based on realization that these operating parameters selected based on sensitivities of the horizontal derivative of vertical velocity to variations of the operating parameters can be estimated using a direct-adjoint looping (DAL) based CFD framework. This framework results in simultaneous correction of various unknown operating parameters serving a common purpose by minimizing a cost function that estimates the errors in line-of-sight data and its gradients between the forward CFD simulation, and available measurements, and then solving a sensitivity (or adjoint-CFD) equation in an iterative manner. The sensitivity of the parameters serving a common purpose is indicative of the direction of convergence of the DAL based CFD framework. Upon the convergence, the DAL based CFD framework can produce both the current values of the operating parameters and the velocity field determined for these operating parameters After the DAL converges, some embodiments extract the quantity of interest, i.e. vertical velocity gradients to correct the bias errors in wind velocity reconstruction over complex terrain, using LiDAR line-of-sight (LOS) on the cone of measurements. In addition, one embodiment enforces incompressibility of the air to correct certain types of errors caused by the sparsity of LOS measurements as contrasted with enforcing the incompressibility to correct the homogenous velocity assumption. This embodiment produces a dense grid of non-constant values of the velocity field at each of the altitudes by enforcing incompressibility and regularization of the wind flow consistent with measurements of radial velocities at each of the altitudes.

Some embodiments are based on realization that when the CFD is used for the purpose of the horizontal derivative of vertical velocity reconstruction, a particular cost function needs to be formulated for selecting the operating parameters of the CFD. This cost function can be selected based on aim of improving the estimate of the ultimate quantities of interest i.e., horizontal derivative of vertical velocity. Notably, this cost function can be different from the cost function that is selected when the objective of the CFD is different.

Specifically, some embodiments are based on realization that the horizontal derivative of vertical velocity have different effects on the velocity field in dependence on the altitude. To that end, when the purpose of the CFD to determine the horizontal derivative of vertical velocity, the cost function needs to consider different altitudes differently, e.g., with different weights. For example, in some embodiments, a cost function includes a weighted combination of errors representing accuracy of CFD for different altitudes. For example, the errors include a first error corresponding to a first altitude and a second error corresponding to a second altitude, and a weight for the first error in the weighted combination of errors is different from a weight of the second error in the weighted combination of errors.

For example, some embodiments select the cost function that is an increasing function of the altitude of the location of measurement. In one embodiment, the analytical form of the first order error term due to homogenous assumption is used to derive the form of cost function. In such a manner, the operating parameters are adapted to increase the accuracy of determination of the horizontal derivative of vertical velocities.

Some embodiments determine the operating parameter iteratively in a direction of maximum decrease of the sensitivities of the cost function. To that end, the CFD simulation is performed multiple times, i.e., once per iteration. To that end, it is desired to reduce a computational cost of the CFD simulation.

Some embodiments are based on realization that rather than using high-fidelity CFD solutions for every new measurement data set (e.g. for every new wind direction and/or new terrain), an efficient and accurate low-fidelity CFD simulation can be used via a Field inversion and Machine Learning (FIML) approach. The low-fidelity CFD simulation approximates high-frequency terms in the flow by an internal parameter dependent model. To that end, the embodiment applies the machine learning using feature vectors including the horizontal derivative of vertical velocity, to learn the dependence of the internal parameters to the flow features. This embodiment can reduce the computational burden on the CFD approximation by using a preprocessing step.

Accordingly, one embodiment discloses a wind flow sensing system for determining velocity fields of a wind flow at a set of different altitudes from a set of measurements of radial velocities at each of the altitudes. The system includes an input interface to accept the set of measurements of radial velocities at line-of-site points for each of the altitudes; a processor configured to determine a first approximation of the velocity field at each of the altitudes by simulating computational fluid dynamics (CFD) of the wind flow operating parameters reducing a cost function of a weighted combination of errors, wherein each error corresponds to one of the altitudes and includes a difference between measured velocities at the line-of-site points at the corresponding altitude and simulated velocities at the line-of-site points simulated by the CFD for the corresponding altitude with current values of the operating parameters, wherein the errors include a first error corresponding to a first altitude and a second error corresponding to a second altitude, wherein a weight for the first error in the weighted combination of errors is different from a weight of the second error in the weighted combination of errors; determine a horizontal derivative of vertical velocity at each of the altitudes from the first approximation of the velocity field at each of the altitudes; and determine a second approximation of the velocity field at each of the altitudes using geometric relationships between a velocity field for each of the altitudes, projections of the measurements of radial velocities on the three-dimensional axes, and the horizontal derivative of vertical velocity for the corresponding velocity field; and an output interface to render the second approximation of velocity fields of the wind flow.

Another embodiment discloses a wind flow sensing method for determining velocity fields of a wind flow at a set of different altitudes from a set of measurements of radial velocities at each of the altitudes, wherein the method uses a processor coupled with stored instructions implementing the method, wherein the instructions, when executed by the processor carry out steps of the method that includes accepting the set of measurements of radial velocities at line-of-site points for each of the altitudes; determining a first approximation of the velocity field at each of the altitudes by simulating computational fluid dynamics (CFD) of the wind flow with operating parameters reducing a cost function of a weighted combination of errors, each error corresponds to one of the altitudes and includes a difference between measured velocities at the line-of-site points at the corresponding altitude and simulated velocities at the line-of-site points simulated by the CFD for the corresponding altitude with current values of the operating parameters, wherein the errors include a first error corresponding to a first altitude and a second error corresponding to a second altitude, wherein a weight for the first error in the weighted combination of errors is different from a weight of the second error in the weighted combination of errors; determining a horizontal derivative of vertical velocity at each of the altitudes from the first approximation of the velocity fields; determining a second approximation of the velocity fields using geometric relationships between a velocity field for each of the altitudes, projections of the measurements of radial velocities on the three-dimensional axes, and the horizontal derivative of vertical velocity for the corresponding velocity field; and rendering the second approximation of velocity fields of the wind flow.

Yet another embodiment discloses a non-transitory computer readable storage medium embodied thereon a program executable by a processor for performing a method for determining velocity fields of a wind flow at a set of different altitudes from a set of measurements of radial velocities at each of the altitudes. The method includes accepting the set of measurements of radial velocities at line-of-site points for each of the altitudes; determining a first approximation of the velocity field at each of the altitudes by simulating computational fluid dynamics (CFD) of the wind flow with operating parameters reducing a cost function of a weighted combination of errors, each error corresponds to one of the altitudes and includes a difference between measured velocities at the line-of-site points at the corresponding altitude and simulated velocities at the line-of-site points simulated by the CFD for the corresponding altitude with current values of the operating parameters, wherein the errors include a first error corresponding to a first altitude and a second error corresponding to a second altitude, wherein a weight for the first error in the weighted combination of errors is different from a weight of the second error in the weighted combination of errors; determining a horizontal derivative of vertical velocity at each of the altitudes from the first approximation of the velocity fields; determining a second approximation of the velocity fields using geometric relationships between a velocity field for each of the altitudes, projections of the measurements of radial velocities on the three-dimensional axes, and the horizontal derivative of vertical velocity for the corresponding velocity field; and rendering the second approximation of velocity fields of the wind flow.

DETAILED DESCRIPTION

Figure 1:
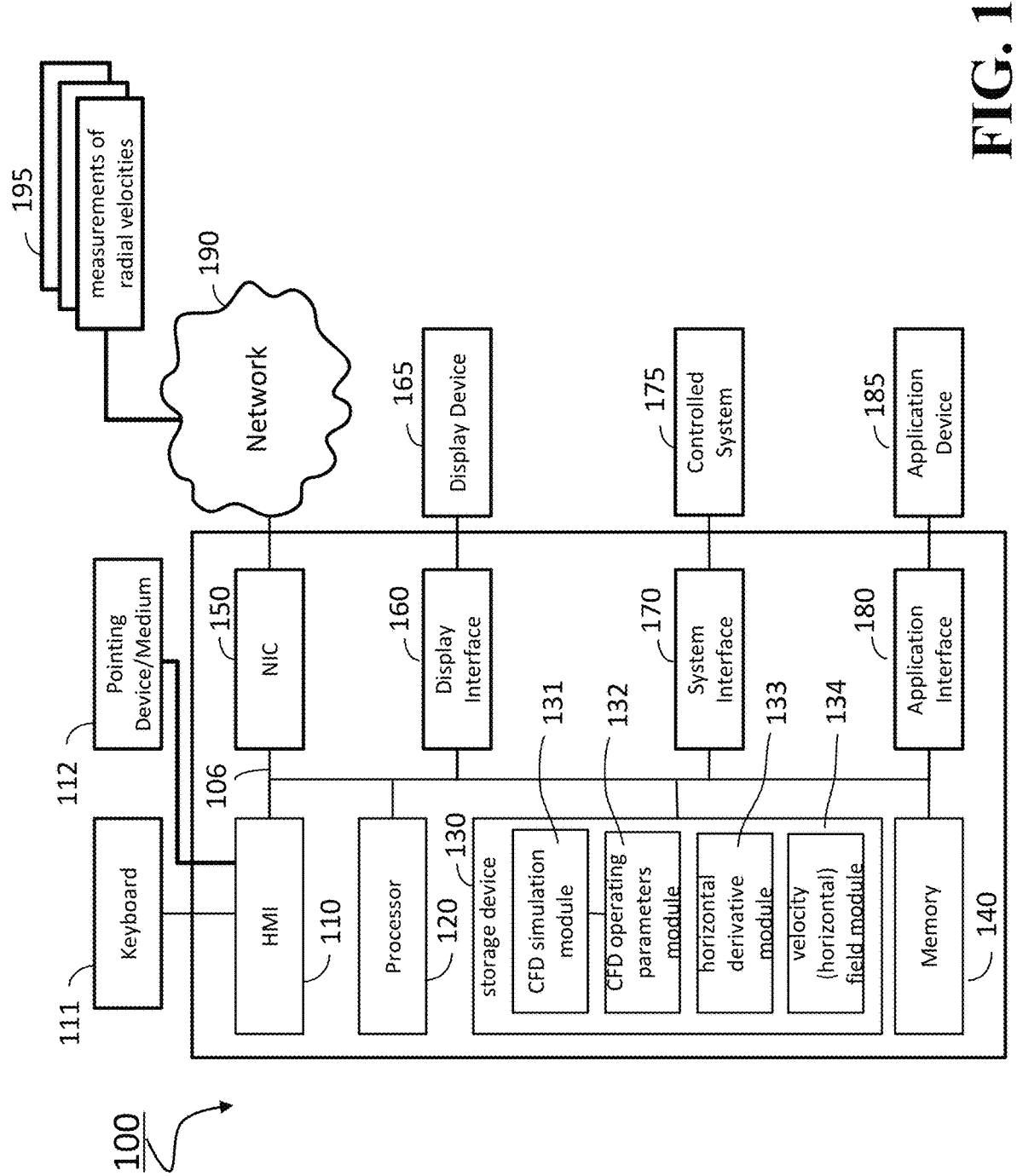
FIG. 1 shows a hardware diagram of different components of a wind flow sensing system in accordance with some embodiments.

FIG. 1 shows a hardware diagram of different components of a wind flow sensing system 100 in accordance with some embodiments. The wind flow sensing system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output interfaces and/or devices.

These instructions stored in the memory 140 implement a method for determining velocity fields of a wind flow at a set of different altitudes from a set of measurements of radial velocities at each of the altitudes. To that end, the wind flow sensing system 100 can also include a storage device 130 adapted to store different modules storing executable instructions for the processor 120. The storage device stores a CFD simulation module 131 configured to the velocity field at each of the altitudes by simulating computational fluid dynamics (CFD) of the wind flow with current values of operating parameters, a CFD operating parameters module 132 configured to determine the values of the operating parameters reducing a cost function, and horizontal derivative module 133 configured to determine a horizontal derivative of vertical velocity at each of the altitudes from the velocity field at each of the altitudes, and a velocity field module configured to determine the velocity filed including the horizontal velocity using the horizontal derivative of vertical velocity and the measurements of the radial velocity. The storage device 130 can be implemented using a hard drive, an optical drive, a thumb drive, an array of drives, or any combinations thereof.

The wind flow sensing system 100 includes an input interface to accept the set of measurements 195 of radial velocities at line-of-site points for each of the altitudes. For example, in some implementations, the input interface includes a human machine interface 110 within the wind flow sensing system 100 that connects the processor 120 to a keyboard 111 and pointing device 112, wherein the pointing device 112 can include a mouse, trackball, touchpad, joy stick, pointing stick, stylus, or touchscreen, among others. Additionally or alternatively, the input interface can include a network interface controller 150 adapted to connect the wind flow sensing system 100 through the bus 106 to a network 190. Through the network 190, the measurements 195 can be downloaded and stored within the storage system 130 for storage and/or further processing. In some implementations, the network 190 connects, through wireless or wired connection, the wind flow sensing system 100 with a remote sensing instrument configured to measure the radial velocities of the wind flow.

The wind flow sensing system 100 includes an output interface to render the velocity fields of the wind flow. For example, the wind flow sensing system 100 can be linked through the bus 106 to a display interface 160 adapted to connect the wind flow sensing system 100 to a display device 165, wherein the display device 165 can include a computer monitor, camera, television, projector, or mobile device, among others.

For example, the wind flow sensing system 100 can be connected to a system interface 170 adapted to connect the wind flow sensing system to a different system 175 controlled based on the reconstructed velocity fields. Additionally or alternatively, the wind flow sensing system 100 can be connected to an application interface 180 through the bus 106 adapted to connect the wind flow sensing system 100 to an application device 185 that can operate based on results of velocity fields reconstruction.

Figure 2A:
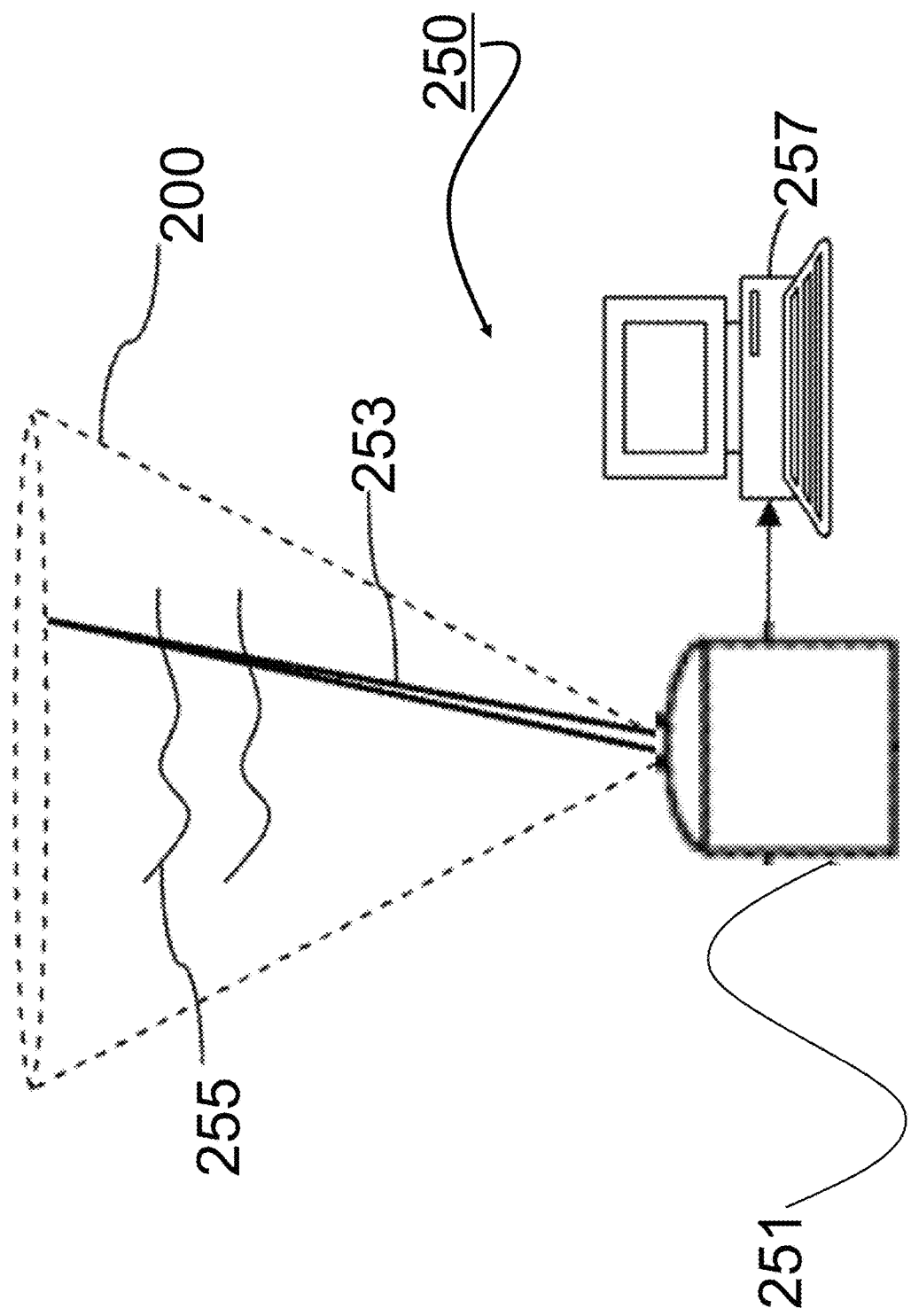
FIG. 2A shows a schematic of an exemplar remote sensing instrument configured to measure the radial velocities of the wind flow according to some embodiments.

FIG. 2A shows a schematic of an exemplar remote sensing instrument configured to measure the radial velocities of the wind flow according to some embodiments. The example of FIG. 2A shows a schematic of a LiDAR 250 that measures the radial velocity 195 of a wind flow at different altitudes. Different embodiments use different remote sensing instruments for taking remote measurements. Examples of these instruments include radar, LiDAR, and SODAR. For clarity purpose, this disclosure uses a LiDAR, such as the LiDAR 250 shown in FIG. 1, as an exemplar remote sensing instrument.

The radial velocity of an object with respect to a given point is the rate of change of the distance between the object and the point. That is, the radial velocity is the component of the object's velocity that points in the direction of the radius connecting the object and the point. In case of atmospheric measurements, the point is the location of a remote sensing instrument, such as radar, LiDAR and SODAR, on Earth, so the radial velocity then denotes the speed with which the object moves away from or approaches the receiving instrument. This measured radial velocity is also referred to as line-of-sight (LOS) velocity.

Remote sensing instrument determines the flow of a fluid, such as air, in a volume of interest by describing the velocity field of the airflow. For example, the LiDAR 250 includes a laser 251 or acoustic transmitter and a receiver in which the return signal is spectranalyzed, a computer 257 for performing further calculations, and navigator for aiming the transmitter and/or receiver at a target in space at a considerable distance from said transmitter and receiver. The receiver detects the return signal 253 scattered due to presence of pollutants between the remote sensing system and said target along the axis of measurement. The waves are transmitted along a cone surface 200 formed by possible aiming directions. The radial velocity of the particles at volume of interest 255 at said target is deduced from frequency shift by the Doppler effect due to specific air pollutants.

Figure 2B:
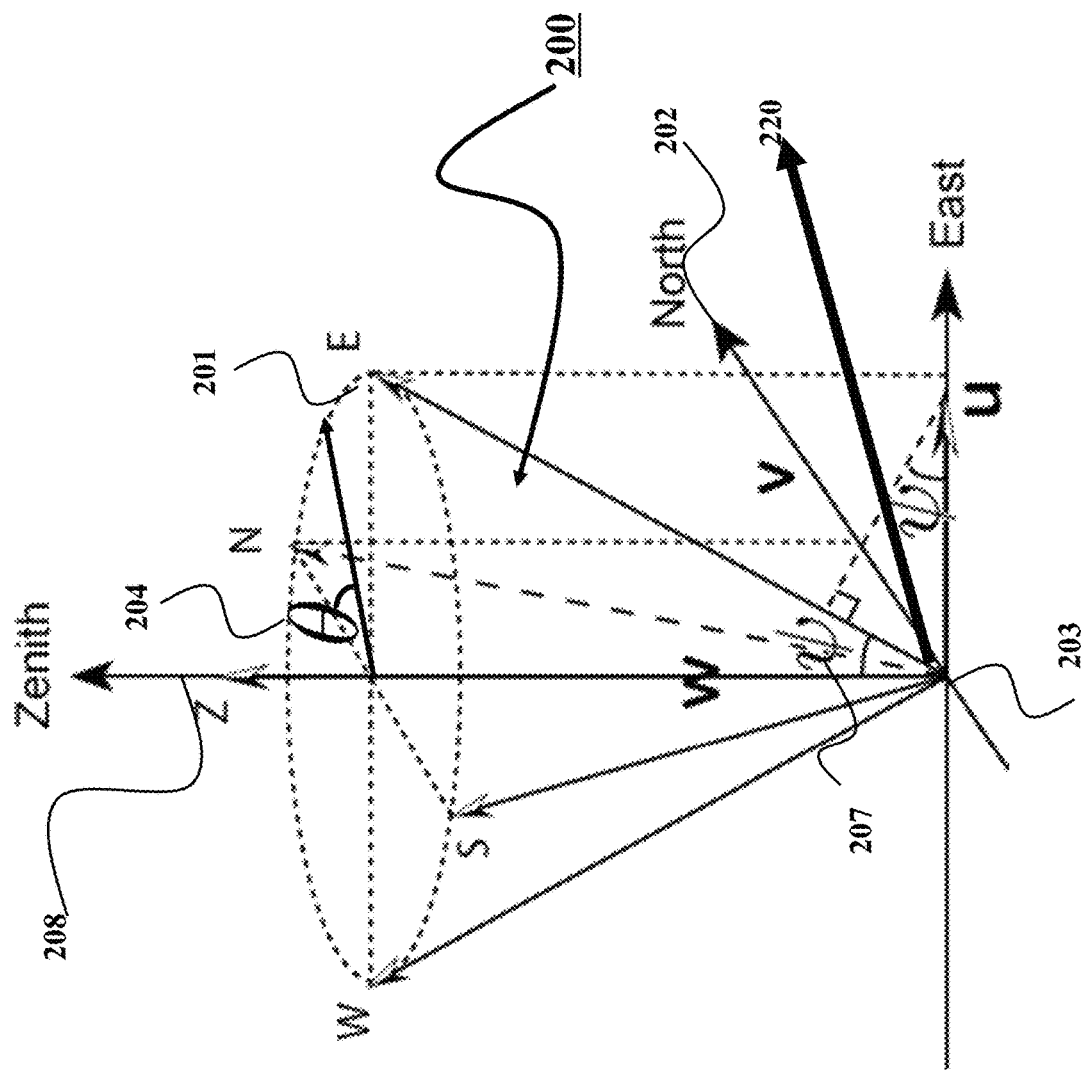
FIG. 2B shows a schematic of geometry of radial velocities measured by some embodiments.
Figure 2B:
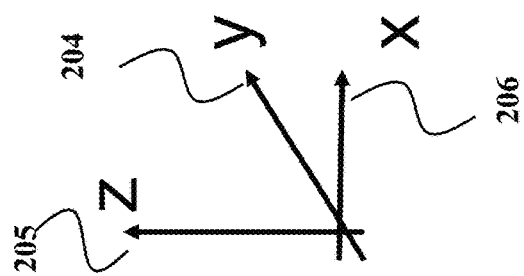

FIG. 2B shows a schematic of geometry of radial velocities measured by some embodiments at a specific altitude along a surface of a cone 200 and along center line of cone 208. The LiDAR measurements provide the radial (line-of-sight) velocity component of the wind, making it difficult to precisely determine wind magnitude and direction, owing to the so-called 'cyclops' dilemma. The radial velocity 201 along one beam shows a projection of a velocity vector 220 with the LiDAR located at position 203 in a Cartesian coordinate system 204, 205, and 206.

Here, θ 204 is the horizontal wind direction measured clockwise from the North 202, ψ 207 is the elevation angle of beam, (u, v, w) are the x 206, y 204, and z 205 components of velocity V of wind at each point in space.

The horizontal velocity $v_h$ at each altitude is defined as $$v_h = \sqrt{u^2+v^2} \quad \text{Equation 1}$$

The radial velocity (also called LOS velocity) is defined on each altitude as $$v_R = u \sin\theta \sin\psi + v \cos\theta \sin\psi + w \cos\psi \quad \text{Equation 2}$$

Figure 3:
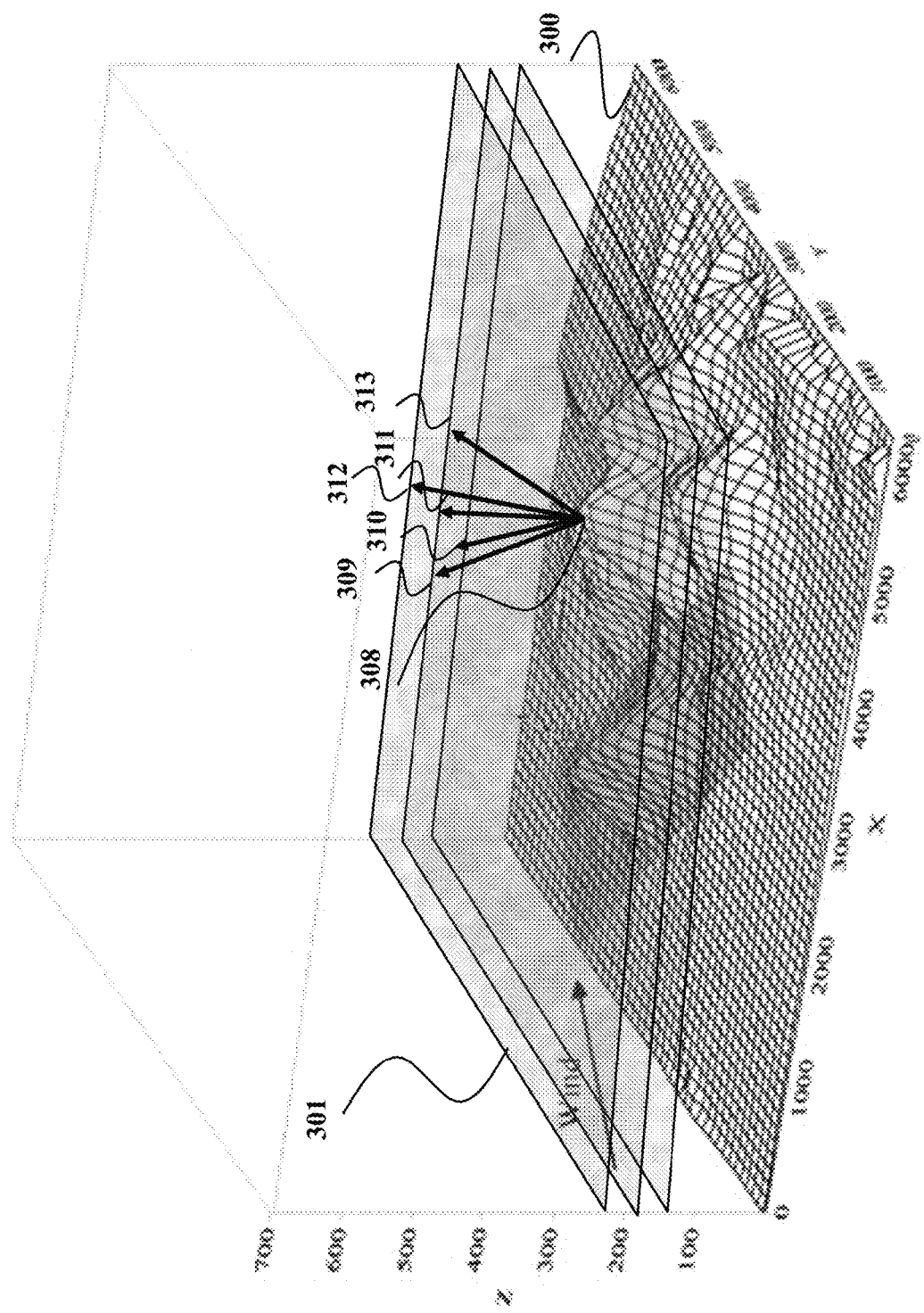
FIG. 3 shows a schematic of a remote sensing of wind over a complex terrain used by some embodiments.

FIG. 3 shows a schematic of a remote sensing of wind over a complex terrain 300 used by some embodiments. The LiDAR 250 arranged at a point 308, e.g., at a top of a hill, performs series of line-of-sight measurements on a cone including measurements 309,310,312,313 along the surface of the cone, and measurements along the center line 311. The measurements are taken for different altitudes illustrated as different planes 301. In such a manner, for each of the altitudes 301, the measurements on the cone are measurements on a circle including multiple measurements of the radial velocities in different angular directions measured at different line-of-site points on a circumference of the circle and one measurement of the radial velocity in a vertical direction measured at a center of the circle.

One embodiment aims to determine a horizontal velocity $v_h$ of the wind flow for each of the altitudes. Given these measurements, an estimate of the horizontal velocity $v_h$ can be determined from the measurements of the radial velocity $v_R$ using a geometrical relationship and assuming that the wind velocity is homogenous on each plane. Here, $V_L=(u_L, v_L, w_L)$ is the estimated velocity of the wind flow based on homogenous assumption.

For example, the following formulas yield the estimated velocity in terms of radial velocities V1, V2, V3, V4, V5 corresponding to beams pointing North, East, South, West and top:

$$u_L = \frac{V1-V3}{2\sin\psi}$$

$$v_L = \frac{V2-V4}{2\sin\psi}$$

$$w_L = V5$$

Some embodiments are based on recognition that, for complex terrains, such as the terrain 300, the homogenous velocity assumption leads to a bias in LiDAR estimation of horizontal velocity. The main error is due to variation of the vertical velocity w in a vertical direction, e.g., along the hill. To that end, some embodiments are based on realization that the homogeneous velocity assumption in sensing wind flow passing over the complex terrain can be corrected using a horizontal derivative of vertical velocity.

Figure 4:
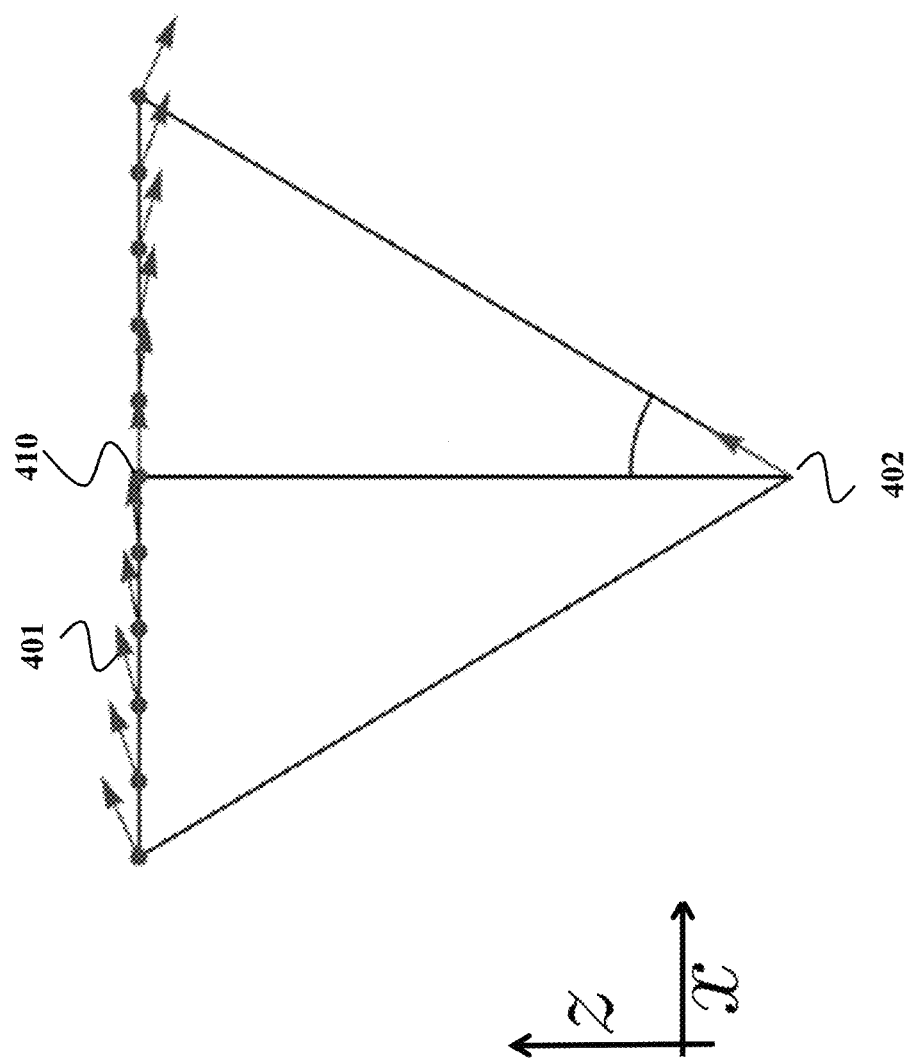
FIG. 4 shows a schematic of exemplar parameters of the wind flow used by some embodiments to estimate the velocity fields of the wind flow.

FIG. 4 shows a schematic of exemplar parameters of the wind flow used by some embodiments to estimate the velocity fields of the wind flow. Some embodiments are based on recognition that the homogeneous velocity assumption in sensing wind flow passing over the complex terrain is incorrect, but can be corrected using horizontal derivative of vertical velocity. FIG. 4 shows a two-dimensional illustration of a wind flow when the device 402 is placed near the top of a hill, e.g., a location 308. The horizontal derivative of vertical velocity can show a change in direction and/or the magnitude of the vertical velocity 401 at a given altitude. In this example, the horizontal derivative of vertical velocity indicates an increase of the vertical velocity along one slop of the hill until the top of the hill at the point 410, and decrease of the vertical velocity from the point 410 over another slop of the hill. Even the first derivative showing the linear change of the vertical velocity can be used to improve accuracy of the wind flow sensing, because the homogeneous velocity assumption causes the leading order terms in the error of the sensed velocity fields.

The error or bias can be written to first order for any point at altitude z above the device as:

$$u_L = u + z\frac{dw}{dx} \quad \text{Equation 3a}$$

$$v_L = v + z\frac{dw}{dy} \quad \text{Equation 3b}$$

Hence the bias due to homogenous assumption is proportional to i) altitude z above the device, ii) the horizontal gradients of vertical velocity dw/dx and dw/dy. Such error is not a function of elevation angle IP and reducing such angle will not reduce the bias in the horizontal velocity.

Some embodiments are based on realization that an estimate of dw/dx and dw/dy may not be obtained solely based on available radial velocity measurements. The resulting system of equation is underdetermined due to symmetry of the scanning beams. Therefore, one cannot get any horizontal gradient information of vertical velocity from such a canonical scan.

Incompressibility of a flow refers to a flow in which the material density is constant within a fluid parcel, an infinitesimal volume that moves with the flow velocity. Such physical principle is based on conservation of mass.

Some embodiments are based on realization that the leading order errors caused by the homogenous velocity assumption are incompressible. In other words, it can be shown that the bias term consisting of product of altitude and horizontal gradient of vertical velocity conserves mass. This implies that for flow over a complex terrain, enforcing incompressibility condition on the volume of fluid inside the domain of interest will not correct the leading order error caused homogenous flow assumption.

Computational fluid dynamics (CFD) is a branch of fluid mechanics that uses numerical analysis and data structures to solve and analyze problems that involve fluid flows. Computers are used to perform the calculations required to simulate the interaction of liquids and gases with surfaces defined by boundary conditions. Some embodiments are based on general understanding that CFD can be used to estimate the velocity fields of the wind from the measurements of the wind on a cone sensed by the LiDAR. However, the operating parameters, such as boundary conditions, for the wind flow over the complex terrains are usually unknown, and the approximation of those operating parameters can undesirably reduce the accuracy of the wind flow sensing.

Some embodiments are based on realization that while a CFD approximation maybe not accurate enough for the determination of the velocity field, the CFD approximation can be accurate enough for an average of the horizontal derivative of vertical velocity reconstruction at a given altitude, which, in turn can be used for correcting the bias due to the homogenous velocity assumption. To that end, some embodiments use the CFD approximation to determine the horizontal derivative of vertical velocity and use the horizontal derivative of vertical velocity in combination with the radial velocity measurements of the wind flow on the desired altitudes to determine the velocity field for the desired altitudes. In such a manner, a target accuracy of the velocity field sensing using the radial velocity measurements can be achieved.

Figure 5A:
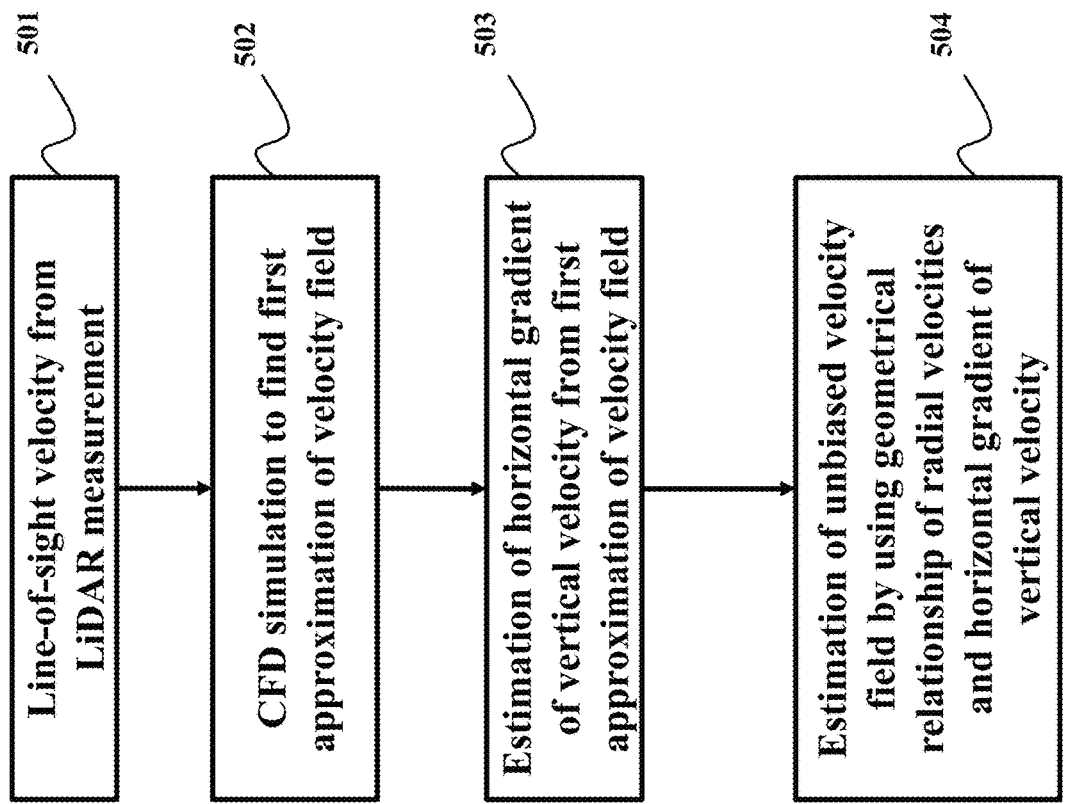
FIG. 5A shows a block diagram of a Computational Fluid dynamics (CFD) framework used by some embodiments.

FIG. 5A shows a block diagram of a Computational Fluid dynamics (CFD) framework used by some embodiments to resolve the prevailing wind flow with the aim of obtaining an accurate measure of the horizontal gradients of vertical velocity at each altitude of interest. Using the line-of-sight measurements 501, a first approximation of the velocity field is obtained 502 by CFD simulation. For example, the CFD simulation can be performed by the module 131 shown in FIG. 1. In a number of situations, the CFD simulation requires the knowledge of operating parameters, such as boundary conditions. Those operating parameters are typically unknown. To that end, some embodiments, determines the operating parameters reducing the difference between the estimated and measured radial velocities. For example, such an estimation can be performed by the module 132 shown in FIG. 1.

While the velocity field in the first approximation provided by CFD is inaccurate for the required purposes, an estimate of the horizontal gradient of vertical velocity 503 can be extracted with required accuracy. Such an extraction can be performed by the module 133. The CFD simulation yields velocity field at discrete points of the mesh. Using this velocity field, the x and y derivative as each discrete point are computed using finite difference method. Then, a single value for x and y horizontal derivatives $$\left(\frac{dw}{dx}, \frac{dw}{dy}\right)$$

of vertical velocity at each plane is extracted by averaging the derivatives in x and y directions over the respective plane.

This horizontal gradient of vertical velocity is then used along with the geometrical relationship between line-of-sight velocity and wind velocity to correct 504 the biased horizontal velocity components $u_L$ and $v_L$ based on homogenous assumption using Eqs. (3a) and (3b). Such an estimation can be performed by the module 134.

Figure 5B:
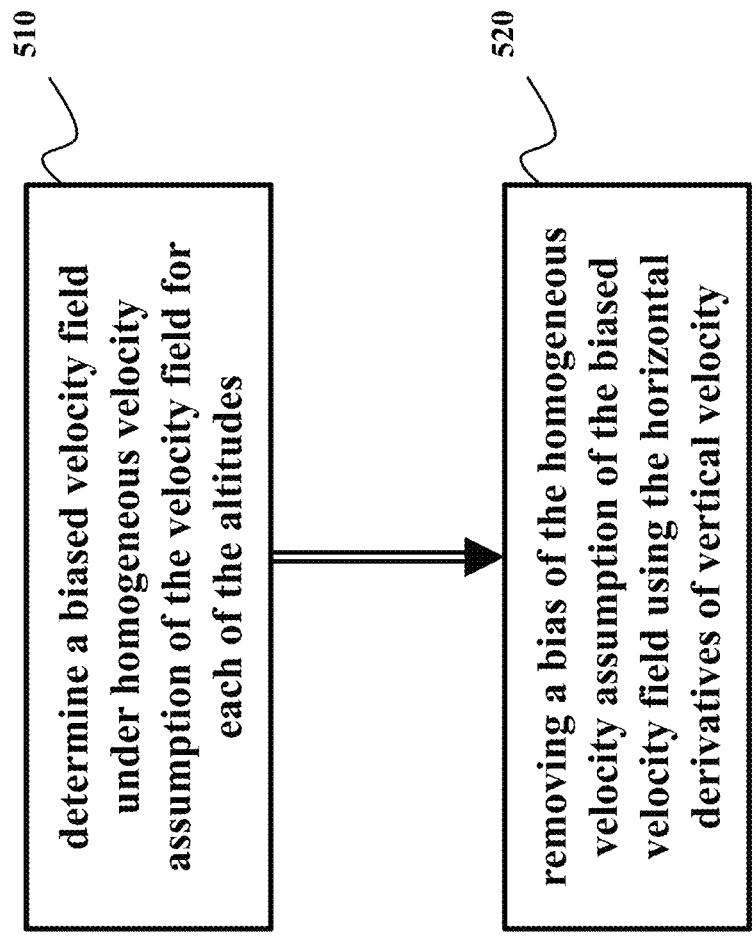
FIG. 5B shows a block diagram of a method for determining an unbiased velocity field according to one embodiment.

FIG. 5B shows a block diagram of a method for determining an unbiased velocity field according to one embodiment. The embodiment, in order to determine the second approximation of the velocity fields, determines 510 a biased velocity field under homogeneous velocity assumption of the velocity field for each of the altitudes and removes 520 a bias of the homogeneous velocity assumption of the biased velocity field for each of the altitudes using the horizontal derivatives of vertical velocity $$\left(\frac{dw}{dx}, \frac{dw}{dy}\right)$$

for the corresponding altitude.

For example, Equations 3a/3b are used to obtain unbiased velocity fields (u, v) from biased velocity field $u_L$, $v_L$ by subtracting the bias terms $$z\frac{dw}{dx} \text{ and } z\frac{dw}{dy}.$$

Figure 6A:
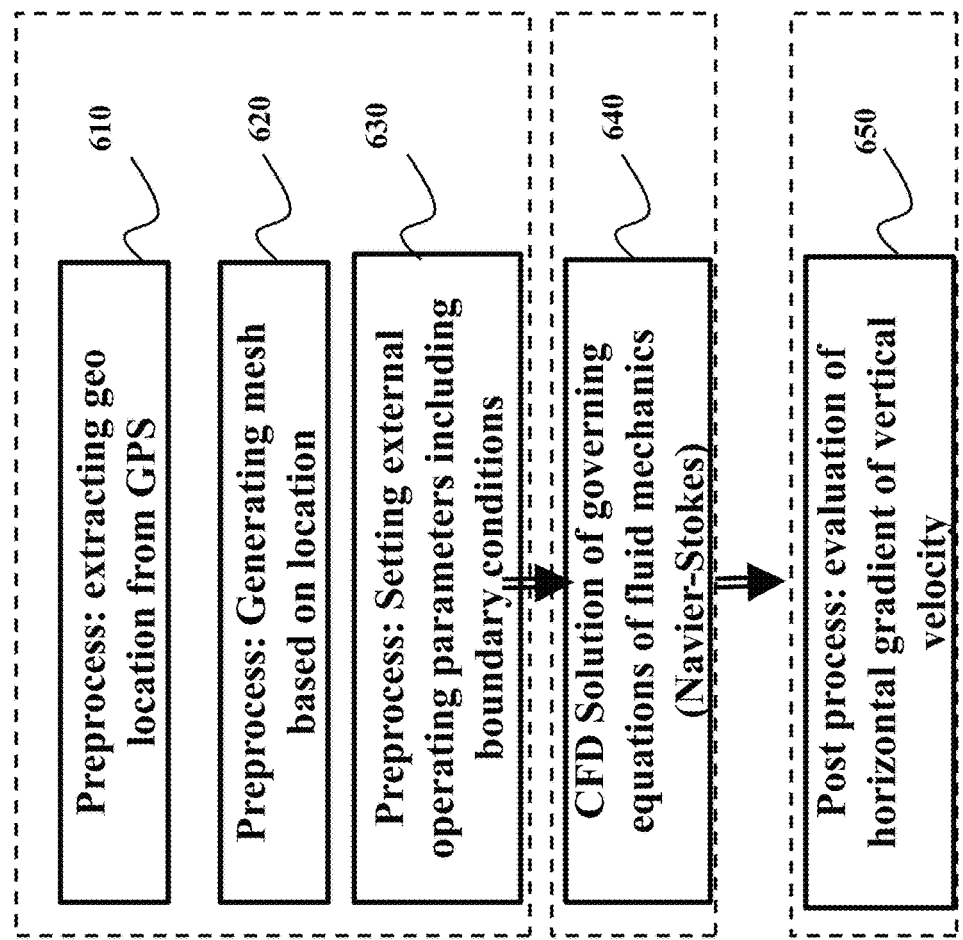
FIG. 6A shows a block diagram of a CFD simulation based framework used by some embodiments to obtain the horizontal gradient of vertical velocity.

FIG. 6A shows a block diagram of a CFD simulation based framework used by some embodiments to obtain the horizontal gradient of vertical velocity 650. The embodiments perform a pre-processing step to define geometry and physical bounds of the CFD simulation. For example, some implementations use computer aided design (CAD) to define the scope of the simulation. The volume occupied by the fluid is divided into discrete cells (the mesh). There is a GPS in the device that extracts the geo-location 610 of the terrain. Such location is then compared against available data-set stored in the device memory to generate the terrain data. Terrain data can be gathered using various resources such as Google or NASA data bases. After the terrain info is read, an optimal radius is chosen to construct the mesh 620.

Figure 6B:
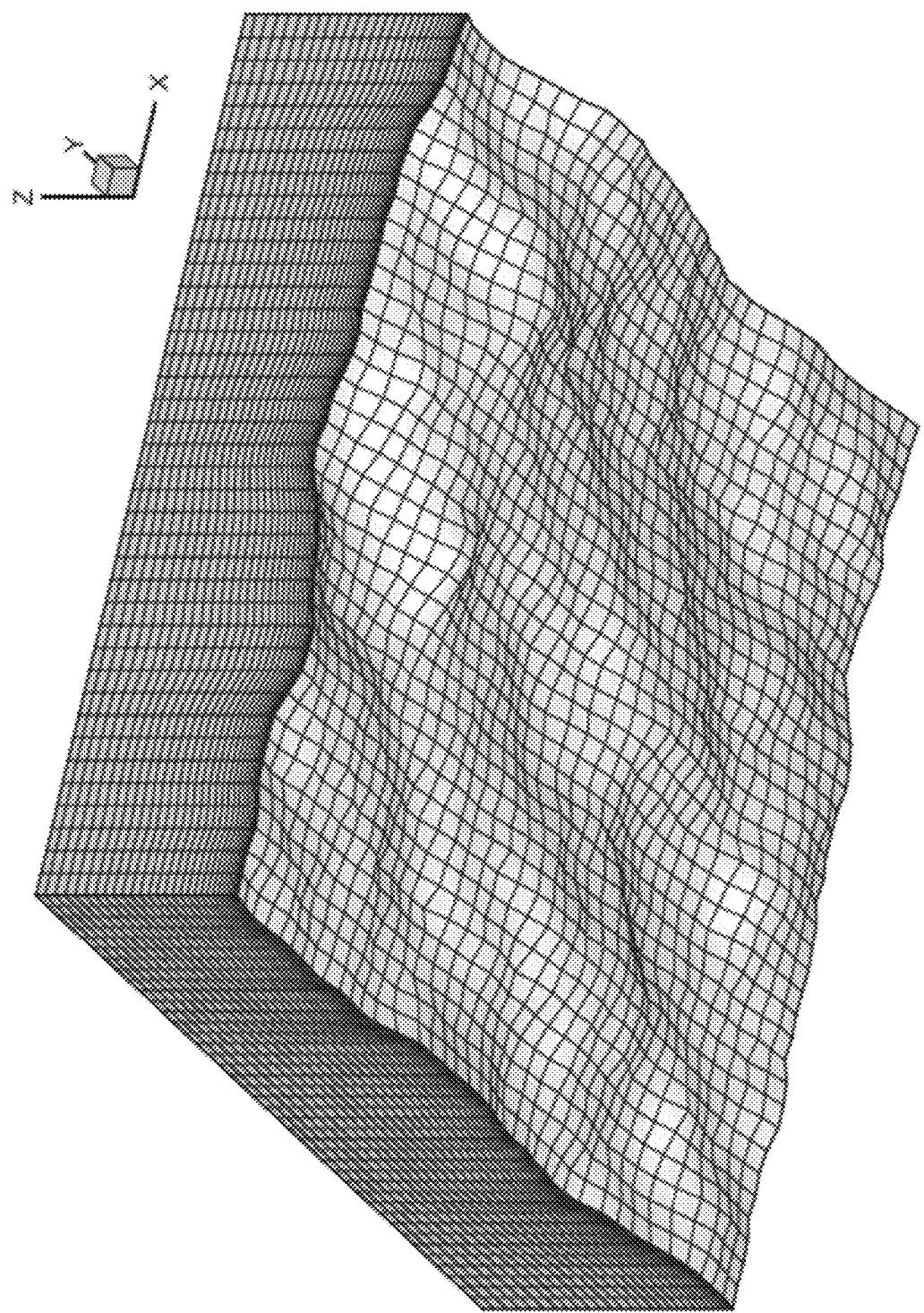
FIG. 6B shows an example of the mesh of the terrain determined by some embodiments.

FIG. 6B shows an example of the mesh 620 determined by some embodiments. In various implementations, the mesh 620 can be uniform or non-uniform, structured or unstructured, consisting of a combination of hexahedral, tetrahedral, prismatic, pyramidal or polyhedral elements. The optimal radius of the domain is selected such that the important terrain structure is captured in the mesh based on the wind direction. Based on the chosen radius at the selected terrain a mesh is generated. The resolution of the mesh is set by the user. In some implementations, a default resolution value of the mesh is 25 m.

During the preprocessing, values of operating parameters 630 are also specified. In some embodiments, the operating parameters specify the fluid behavior and properties at all bounding surfaces of the fluid domain. A boundary condition of a field (velocity, pressure) specifies the value of the function itself, or the value of the normal derivative of the function, or the form of a curve or surface that gives a value to the normal derivative and the variable itself, or a relationship between the value of the function and the derivatives of the function at a given area. The boundary conditions at solid surfaces defined by the terrain involve the fluid speed can be set to zero. The inlet velocity is decided based on the direction of the wind and the velocity having log profiles with respect to height, over flat terrains.

Some embodiments perform the simulation of the CFD by solving 640 one of the variations of the Navier-Stokes equations defining the wind flow with the current values of the operating parameters. For example, the CFD solves the Navier-Stokes equation along with mass and energy conservation. The set of equations are proved to represent the mechanical behavior of any Newtonian fluid, such as air, and are implemented for simulations of atmospheric flows. Discretization of the Navier-Stokes equations is a reformulation of the equations in such a way that they can be applied to computational fluid dynamics. The numerical method can be finite volume, finite element or finite difference, as we all spectral or spectral element methods.

The governing equations, Navier-Stokes, are as follows:

$$V \cdot \nabla V + \frac{1}{\rho}\nabla p - \nu \nabla^2 V = 0 \qquad \text{Equation 4a}$$

$$\nabla \cdot V = 0 \qquad \text{Equation 4b}$$

$\nabla \cdot$ is divergence operator. $\nabla$ is gradient operator and $\nabla^2$ is Laplacian operator.

Some embodiments denote the equations 4a and 4b as $N(p,V)=0$, the inlet velocity and direction are indicated by $V_{in}$, $\Theta_{in}$; p: pressure of air [pa] or [atm], $\rho$: density of air [kg/m$^3$], $\nu$: kinematic viscosity [m$^2$/s].

After the CFD simulation, the embodiments extract 650 the horizontal gradients of vertical velocity.

Figure 7:
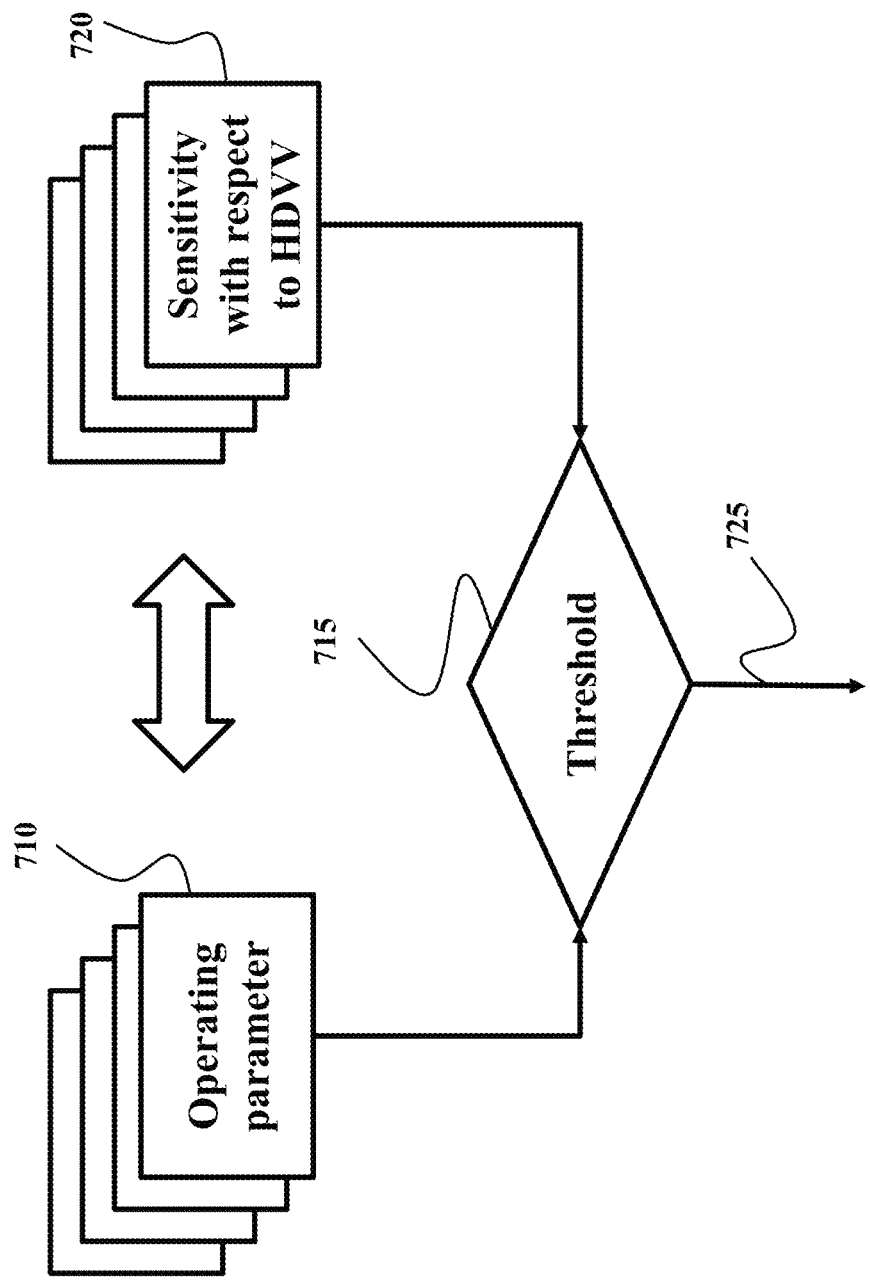
FIG. 7 shows a block diagram of a method for selecting operating parameters according to some embodiments.

FIG. 7 shows a block diagram of a method for selecting operating parameters according to some embodiments. For example, some embodiments select 725 the operating parameters 710 based on the sensitivity 720 of the horizontal derivative of vertical velocity to the variations in the values of these operating parameters. In one embodiment, the operating parameters with the sensitivity above a threshold 715 are selected in the purpose-based set of operating parameters approximated during CFD simulation. In such a manner, some embodiments adapt the unknown operating parameters of the CFD to the purpose of the CFD approximation. Such an adaptation of the operating parameters reduces the computational burden without reducing the accuracy of CFD approximation of quantities of interest. For example, some embodiments select the operating parameters such as terrain roughness, inlet mean velocity, inlet turbulence intensities, and atmospheric stability conditions.

In some embodiments, the operating parameters include inlet boundary conditions (velocity, direction), surface roughness, atmospheric stability. In one embodiment, the operating parameters are chosen to be the inlet boundary conditions (velocity, direction), surface roughness, inlet turbulent kinetic energy and dissipation. The values of these parameters are not directly available from the LOS LiDAR measurements.

$$V_{in} = \frac{V^*}{\kappa} \ln\left(\frac{z+z_0}{z_0}\right) \qquad \text{Equation 5a}$$

$$k_{in} = \frac{V^{*2}}{\sqrt{C_\mu}} \qquad \text{Equation 5b}$$

$$\epsilon_{in} = \frac{V^{*3}}{\kappa(z+Z_0)} \qquad \text{Equation 5c}$$

$$V^* = \frac{V_{ref}\kappa}{\ln\left(\frac{z_{ref}+z_0}{z_0}\right)} \qquad \text{Equation 5d}$$

$C_\mu$ a constant in k–$\in$ turbulence model
$\kappa$ von Karman's constant
$V^*$ friction velocity [m/s]
$V_{ref}$ a reference velocity chosen at a reference location. The reference location can be arbitrary. [m/s]
$z_{ref}$ is the reference altitude. [in]
$z_0$ surface roughness. [in]

The turbulence kinetic energy, k, is the kinetic energy per unit mass of the turbulent fluctuations. Turbulence dissipation, E is the rate at which turbulence kinetic energy is converted into thermal internal energy.

Some embodiments are based on recognition that in a number of situations the operating parameters for simulating the CFD are unknown. For example, for the case described above, in equations 5a-5d at inlet $V_{ref}$, $z_{ref}$, $z_0$ are unknown operating parameters, and the remote sensing measurements does not directly provide such values.

Figure 8:
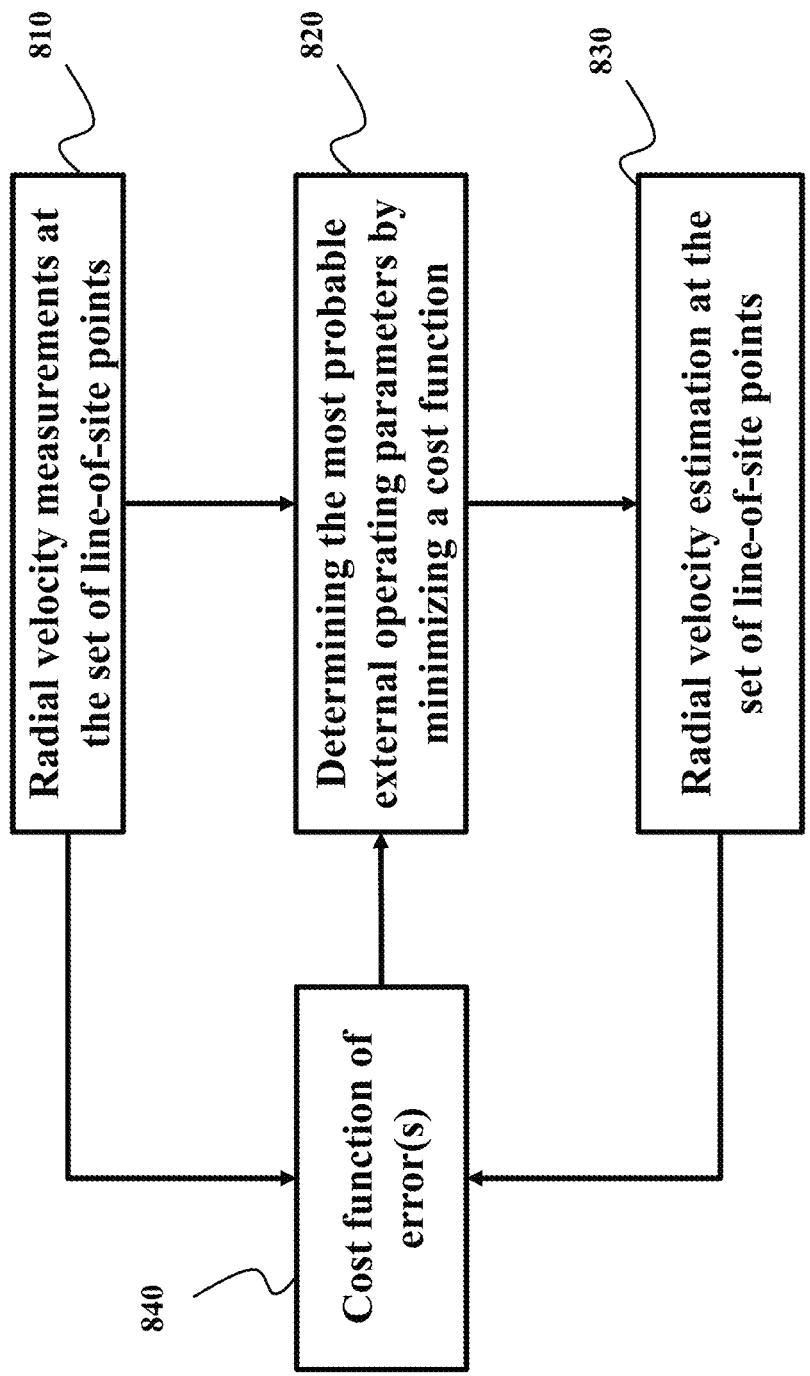
FIG. 8 shows a flowchart of a method for determining current values of the operating parameters according to some embodiments.

FIG. 8 shows the flowchart of a method for determining current values of the operating parameter according to some embodiments. Specifically, some embodiments determine 820 the operating parameters that minimize the error between the measurements of the radial velocity 810 at a set of line-of-site points and the estimation 830 of the radial velocity at the same set of line-of-site points performed by the CFD with the current values of the operating parameters.

Figure 9:
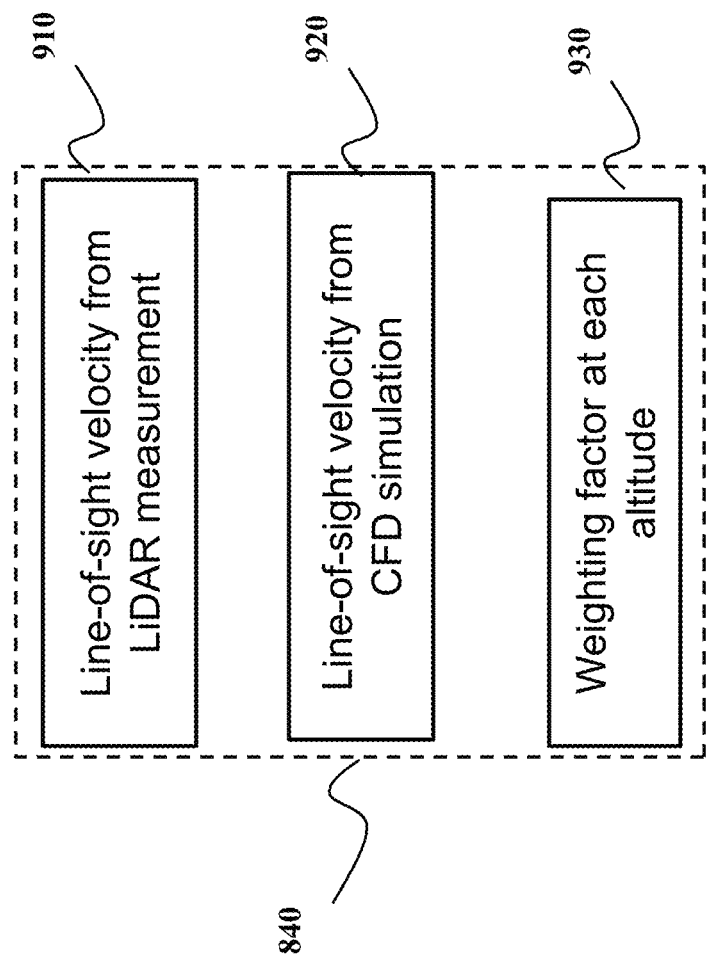
FIG. 9 shows a schematic of assigning different weights to different terms in cost function according to some embodiments.

Some embodiments are based on realization that when the CFD is used for extracting the horizontal derivative of vertical velocity, a particular cost function 840 needs to be minimized to obtain an estimate of the operating parameters. Specifically, some embodiments are based on realization that the horizontal derivative of vertical velocity have different effects on the velocity field in dependence on the altitude. To that end, the cost function 840 includes a weighted combination of errors. Each error corresponds to one of the altitudes and includes a difference between measured velocities at the line-of-site points at the corresponding altitude and simulated velocities at the line-of-site points simulated by the CFD for the corresponding altitude with current values of the operating parameters. In addition, the weights for at least some errors are different. For example, the errors include a first error corresponding to a first altitude and a second error corresponding to a second altitude, wherein a weight for the first error in the weighted combination of errors is different from a weight of the second error in the weighted combination of errors FIG. 9 shows the process of assigning different weights to different terms in cost function according to some embodiments. In some examples, the cost function 840 returns a number representing how well the CFD simulation 920 matches with LiDAR data 910 along the line of sight of different beams at various altitudes. To that end, when the purpose of the CFD to determine the horizontal derivative of vertical velocity, the cost function needs to consider different altitudes differently, e.g., with different weights 930. For example, in some embodiments, a cost function includes a weighted combination of errors representing accuracy of CFD for different altitudes.

In one embodiment, the cost function is $$K = \Sigma_{i=1}^{i=N} w_i (v_{R,i} - v_{R,CFD})^2 \qquad \text{Equation 6}$$

i is each measurement point, $v_{R,i}$ is the light-of-sight velocity at location of point i and $v_{R,CFD}$ is the radial velocity computed from CFD simulation at location of point i, $w_i$ is the weighting factor. The error in each term is proportional to the difference of radial velocity between measurement and CFD. To give more weight to the estimation vertical velocity gradients at higher altitudes since they contribute more to the bias due to homogenous assumption (see Eqn 3), some implementation set the weighting factor $w_i$ proportional to the altitude, i.e. height above the transmitter location.

For example, $v_{R,CFD}$ are the sets of radial velocities obtained from the CFD simulation of the wind flow to produce a first approximation of the velocity fields reducing a cost function of a weighted combination of errors given in equation (6).

The sets of $v_R$ denote measurements of radial (or Line-of-sight) velocities given by remote sensing device of the wind flow. Such values have very small error and are used as true value of wind in the beam direction. Each term in equation (6), denoted by i, corresponds to an error due to one of the altitudes and includes a difference between measured velocities at the line-of-site points at the corresponding altitude, $v_R$, and simulated velocities at the line-of-site points simulated by the CFD for the corresponding altitude. The weight of each error in the weighted combination of errors is an increasing function of a value of the corresponding altitude.

Some embodiments are based on realization that unknown values of the operating parameters can be estimated using a direct-adjoint looping (DAL) based CFD framework. This framework results in simultaneous correction of various unknown parameters serving a common purpose by minimizing a cost function that estimates the errors in line-of-sight data and its gradients between the forward CFD simulation, and available LiDAR measurements, and then solving a sensitivity (or adjoint-CFD) equation in an iterative manner. The sensitivity of the parameters serving a common purpose is indicative of the direction of convergence of the DAL based CFD framework. The simultaneous correction reduces the computational time of updating multiple operating parameters.

Some embodiments denote by $(\xi_1, \xi_2, \ldots \xi_n)$ the set of operating parameters that needs to be estimated. Then, the sensitivity of cost function J with respect to any operating parameter $\xi_i$ can be expressed as $$\frac{\delta J}{\delta \xi_i} = \frac{J(\xi_i + \delta \xi_i, \xi_1, \ldots, \xi_{i-1}, \xi_{i+1,\ldots}) - J(\xi_i - \delta \xi_i, \xi_1, \ldots, \xi_{i-1}, \xi_{i+1,\ldots})}{2\delta \xi_i} \qquad \text{Equation 7}$$

Figure 10:
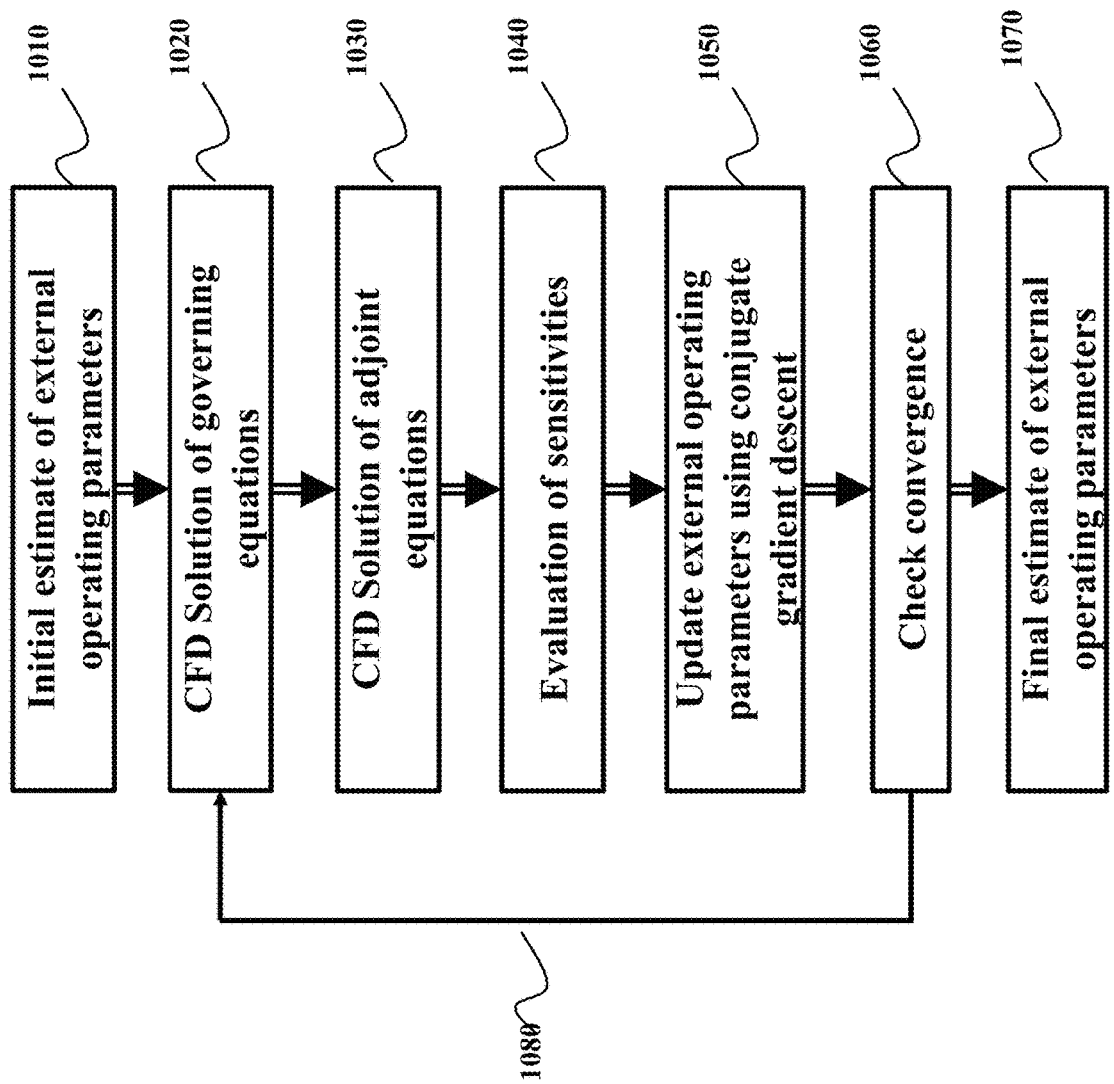
FIG. 10 shows the block diagram of a method for iterative determination of the operating parameters of the CFD according to some embodiments.

FIG. 10 shows the block diagram for implementation of DAL used by one embodiment to determine the operating parameters and the results of the CFD simulation in iterative manner. This embodiment to estimates the most probable values of the operating parameters by evaluating the CFD simulation. DAL is an optimization method that solves the CFD equations 1020 and the adjoint (or sensitivity) equations 1030 in an iterative 1080 manner to obtain sensitivities 1040 of a cost function with respect to the unknown operating parameters at the current estimate of the operating parameters. DAL method is initialized 1010 with a guess for operating parameters. For example, the inlet velocity is estimated using Bernoulli's equation and angle is estimated using homogenous assumption. After each iteration, the estimate of current values of the operating parameters is updated using conjugate gradient descent 1050, updated in a direction of the maximum decrease of the sensitivities of the cost function. To that end, the CFD simulation is performed multiple times, i.e., once per iteration, and if the change in estimate from previous iteration is below a threshold, the DAL method is taken to be converged 1060.

The DAL method is obtained by formulating a Lagrangian $$L = J + \int_\Omega (p_a, V_a) N(p, v) d\Omega \qquad \text{Equation 8}$$

Since N(p,V)=0 in equations (Navier-Stokes equations), equation L and J are equal when the value of p and V are accurate. Considering the variation of $\xi_i$ the variation of L can be expressed as $$\delta L = \frac{\delta L}{\delta \xi_i} d\xi_i + \frac{\delta L}{\delta V} dV + \frac{\delta L}{\delta p} dp \qquad \text{Equation 9}$$

To determine the term $$\frac{\delta L}{\delta \xi_i},$$

the adjoint variables are chosen to satisfy $$\frac{\delta L}{\delta V} \delta V + \frac{\delta L}{\delta p} \delta p = 0.$$

Hence, the DAL method involves new variables ($V_a, p_a$), which denote adjoint velocity, and pressure, respectively, to make $\partial J/\partial \xi_i$ computable.

In one embodiment, the unknown parameters are chosen to be $V_{in}$, $\Theta_{in}$, i.e. the inlet velocity and inlet angle. Therefore, the problem of finding $V_{in}$, $\Theta_{in}$ that minimize J is transformed into the problem of finding $V_{in}$, $\Theta_{in}$ that minimize the augmented objective function L. For example, to determine $\delta/\delta V_{in}$ and $\delta/\delta \Theta_{in}$, DAL approach can be used by setting $\xi_i = V_{in}$ or $\xi_i = \Theta_{in}$.

$p_a$: adjoint pressure
$v_a$: adjoint velocity

The adjoint equations in step 1030 are given by $$-V \cdot \nabla V_a + \nabla V^T \cdot V_a + \frac{1}{\rho} \nabla p_a - \nu \nabla^2 V_a = 0 \quad \text{Equation 10a}$$

$$\nabla \cdot V_a = 0 \quad \text{Equation 10b}$$

The operator $\nabla V^T$ corresponds to the transpose of the gradient of velocity vector.

Adjoint variables can be used to determine the sensitivity 1040 of cost function to any operating parameter $$\frac{\delta L}{\delta \xi_i} = \frac{\delta J}{\delta \xi_i} + \int_\Omega (p_a, V_a) \frac{\delta N(p, V)}{\delta \xi_i} d\Omega \quad \text{Equation 11}$$

For example, equation 11 can be written for the sensitivity of cost function with respect to inlet velocity $V_{in}$ as $$\frac{\delta J}{\delta V_{in}} = \int_{A_{in}} (p_a - \nu(n \cdot \nabla)V_a) dA_{in} \quad \text{Equation 12}$$

$A_{in}$: inlet area of computational domain $\Omega$ [m²]
n: unit normal vector of $A_{in}$ [m²]

By using the gradient descent algorithm, the estimate of an operating parameter $\xi_i$ can be updated 1050 as $$\xi_i^{new} = \xi_i^{old} - \lambda \frac{\delta J}{\delta \xi_i} \quad \text{Equation 13}$$

$\lambda$ a positive constant representing the step size, which can be chosen using a number of standard algorithms.

One needs two simulation to determine sensitivity of each operating parameter using equation 7 for every iteration. When the number of operating variables is large, such computational cost is considerable. Using DAL method, only equation (4) and (10) are solved once per iteration regardless of the number of unknown parameters, and hence reduce the computational cost and make the optimization problem feasible to solve. This is an advantage of adjoint method over methods that determine the sensitivity of cost function by directly measuring the disturbance of the cost function.

After the DAL converges to produce the current values of the external operating parameters 1070, some embodiments extract the quantity of interest, i.e. vertical velocity gradients to correct the bias errors in wind velocity reconstruction over complex terrain, using LiDAR line-of-sight (LOS) on the cone of measurements.

Figure 11:
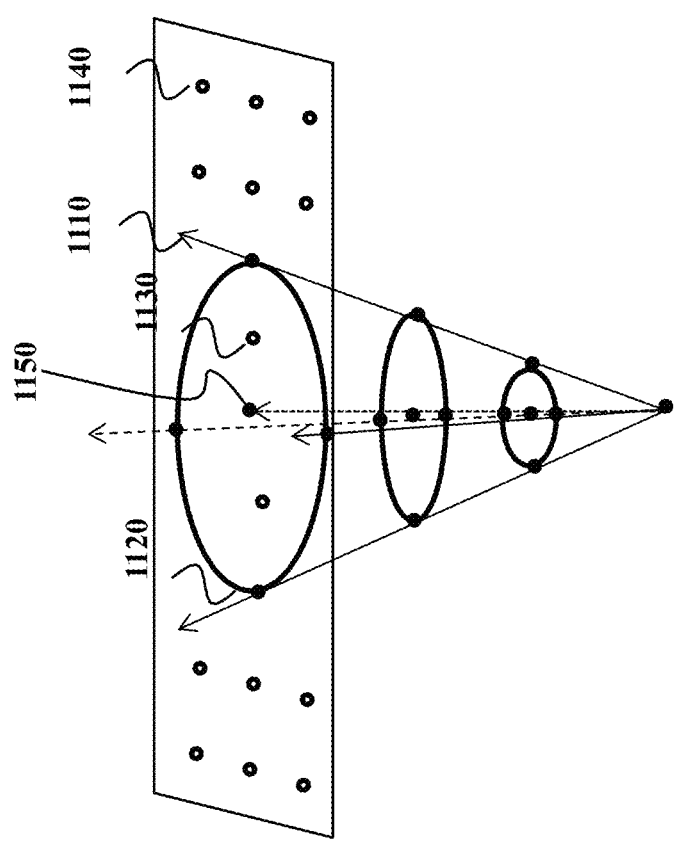
FIG. 11 shows an example of various data points on a single plane, related to the wind flow sensing according to some embodiments.

FIG. 11 shows an example of various data points on a single plane, related to the wind flow sensing according to some embodiments. In this example, the points on the circle 1120 are the points at which the radial velocities 1110 are measured. In some implementations, the velocity field for each of the altitudes includes values of the velocity of the wind inside and outside of the cone, i.e., the circle 1120.

Additionally or alternatively, in some embodiments, the horizontal derivative of vertical velocity at each of the altitudes defines a gradient of the vertical velocity at the center of the circle of the cone defining the measurements of the LiDAR for the corresponding altitude. For example, some embodiments average the velocities and/or the gradients for each altitude to produce the center 1150 of the cone and the circle 1120. In those embodiments, the second approximation of velocity field, obtained via geometrical relationship and the removal of bias using the horizontal gradient of velocity, provides single value of velocity field on each plane (or each altitude). In such a manner, the unbiased velocity value at 1130 and 1140 are taken to be equal to that single value.

To that end, in one embodiment, the second approximation of velocity field includes a single value of the velocity field for each of the altitudes. In addition, the embodiment transforms the single value into a dense grid of non-constant values of the velocity field at each of the altitudes by enforcing incompressibility and regularization of the wind flow consistent with measurements of radial velocities at each of the altitudes. After such a transformation, the horizontal velocities at the points inside and outside of the cone, such as the points 1120, 1150, 1130, and 1140 can have different values.

Figure 12:
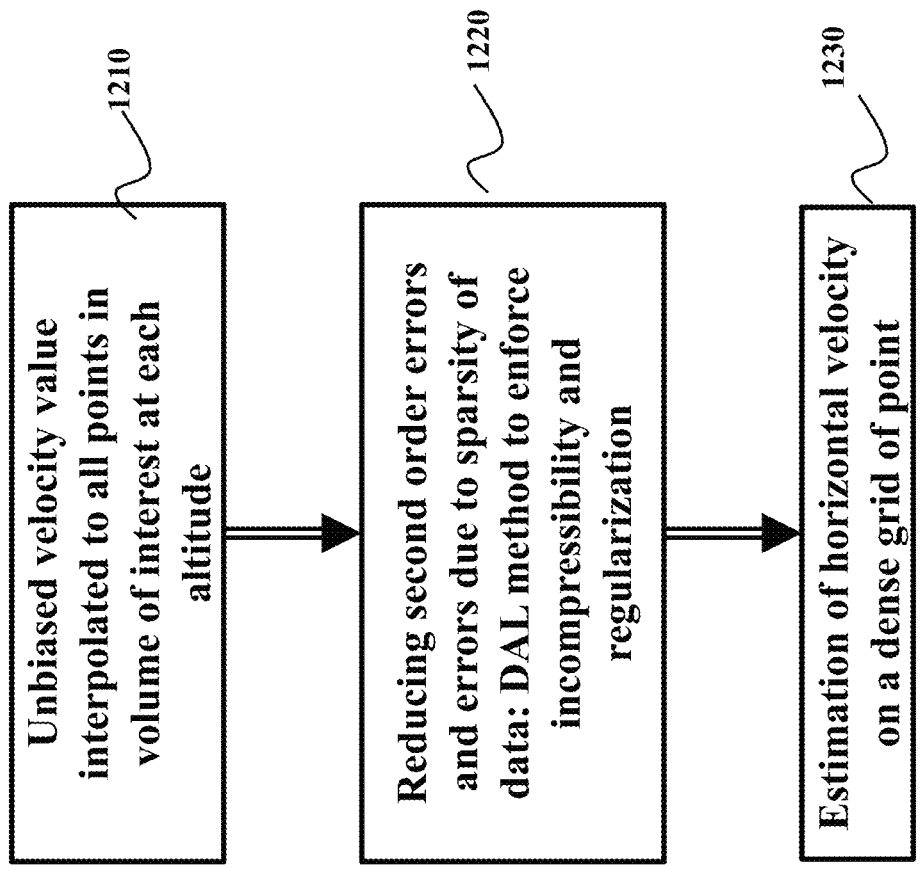
FIG. 12 shows the flowchart of a method for determining horizontal velocities of the wind flow according to one embodiment.

FIG. 12 shows the flowchart of a method for determining horizontal velocities of the wind flow according to one embodiment. The embodiment, starting with same unbiased value at all points on a single plane 1210, enforces incompressibility of the air 1220 to correct errors 1220 caused by the sparsity of LOS measurements and the second order errors due to homogenous assumption to produce a dense grid of velocity values 1230. In various embodiments, the density of the grid of points is a user-specified value. Notably, in this embodiment, the incompressibility of the air is used for correcting the second order errors as contrasted with enforcing the incompressibility to correct the leading order errors due to homogenous velocity assumption.

In some implementations, the dense grid of non-constant values of the velocity field is determined using Direct-Adjoint-Looping based algorithm. The algorithm begins by interpolating in each plane the unbiased velocity values 1210 at all discrete points on the grid. The DAL problem 1220 is formulated to enforce incompressibility in the volume, while minimizing a cost function that has two terms: one measuring the difference between the final velocity field and the initial velocity field at discrete points, and another is a regularization term for increasing the smoothness of the velocity field. The resulting adjoint equation for adjoint variable A is:

$$\frac{\partial^2 \lambda}{\partial^2 x^2} + \frac{\partial^2 \lambda}{\partial y^2} + \alpha^2 \frac{\partial \lambda}{\partial z^2} = -2\nabla \cdot U^k$$

Where $U^k$ the velocity field at k-th iteration of DAL loop. At end of each iteration, an update is carried out as follows:

$$U^{k+1} = U^k + 0.5 \nabla \cdot \lambda$$

The algorithm ends when convergence is reached.

In solution of Navier-Stokes equations, the computational cost depends on the velocity and viscosity of the fluid. For atmospheric flows, the computational cost is very large as the wind velocity is high while the viscosity of air is small. This results in so-called high Reynolds number flows for which the destabilizing inertial forces within the flow are significantly larger than the stabilizing viscous forces. To fully resolve the dynamics and to avoid numerical instability, all the spatial scales of the turbulence must be resolved in the computational mesh, from the smallest dissipative scales (Kolmogorov scales), up to the integral scale proportional to the domain size, associated with the motions containing most of the kinetic energy.

Large eddy simulation (LES) is a popular type of CFD technique for solving the governing equations of fluid mechanics. An implication of Kolmogorov's theory of self-similarity is that the large eddies of the flow are dependent on the geometry while the smaller scales more universal. This feature allows one to explicitly solve for the large eddies in a calculation and implicitly account for the small eddies by using a subgrid-scale model (SGS model). CFD simulations using LES method can simulate the flow field with high fidelity but the computational cost is very expensive.

Some embodiments are based on realization that rather than using high-fidelity CFD solutions for every new measurement data set (e.g. for every new wind direction and/or new terrain), a low-fidelity model can be modified to learn the internal model parameters needed for desired accuracy in the result.

Figure 13:
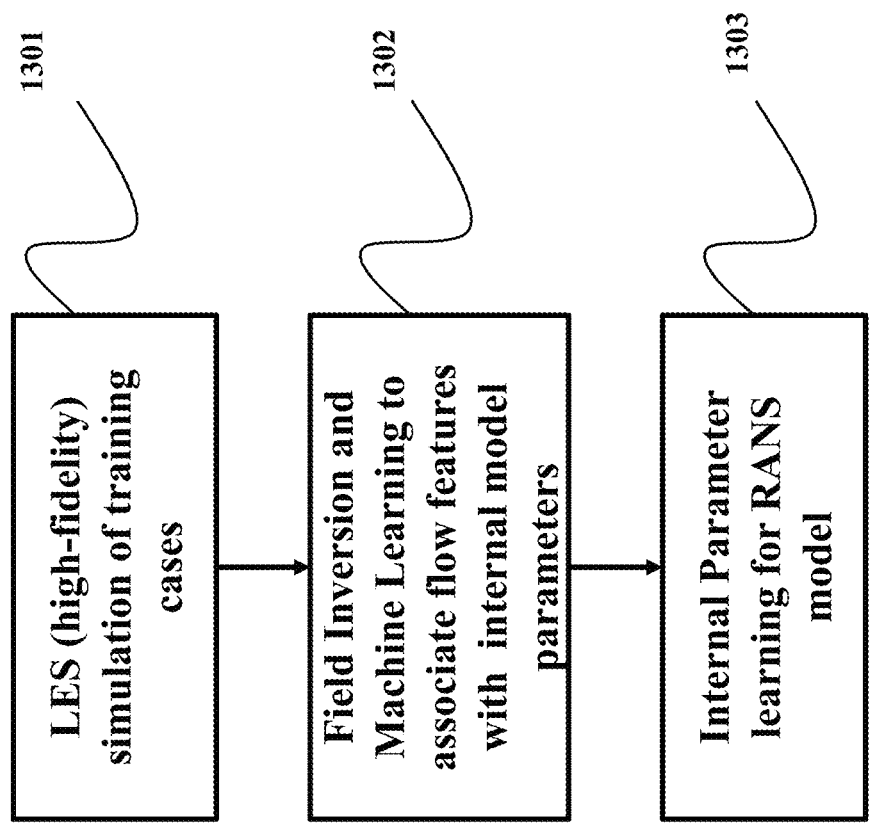
FIG. 13 shows a block diagram of a method for CFD simulation according to one embodiment.

FIG. 13 shows a block diagram of a method for CFD simulation according to one embodiment. The low-fidelity CFD simulation approximates small scale terms in the flow by a model that depends on some internal parameters. To that end, the embodiment applies the Field inversion and Machine Learning (FIML) approach 1302 using feature vectors including the horizontal derivative of vertical velocity, to learn the dependence of the internal parameters of low fidelity models 1303 to the flow features in the high-fidelity LES simulation 1301.

The low-fidelity CFD model that we use are the Reynolds-averaged Navier-Stokes equations (or RANS equations). These are time-averaged equations of motion for fluid flow. These models have internal parameters to approximate the terms not being resolved due to low fidelity. The correct values of these internal parameters are problem specific, and hence to make RANS nearly as accurate as that of LES, the FIML framework is adopted. The significant advantage of using RANS in conjunction with FIML is a cost reduction of CFD simulations for high Reynolds number by several orders of magnitude compared to high fidelity LES simulations, while maintaining desired accuracy. Once the internal model parameters for low-fidelity model are fixed offline, RANS based CFD simulations can be performed if the operating parameters are known.

In such a manner, in some embodiments, the simulation of the CFD of the wind flow is performed by solving Reynolds-averaged Navier-Stokes (RANS) equations, while the internal operating parameters of the RANS equations are determined using a field inversion and machine learning (FIML) with feature vectors including the horizontal derivative of vertical velocity of each of the altitude.

The relative error of the LiDAR versus the cup anemometer is about 8% using the homogenous assumption for calculating the horizontal velocity, and about 1% using the method according to the invention and using CFD and DAL to find the most feasible operating parameters with focus on inlet velocity and wind direction. Moreover, some embodiments enforced the incompressibility assumption to reconstruct a dense field in and outside of the conical region.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A wind flow sensing system for determining velocity fields of a wind flow at a set of different altitudes from a set of measurements of radial velocities at each of the altitudes, comprising:

an input interface to accept the set of measurements of radial velocities at line-of-site points for each of the altitudes;

a processor configured to determine a first approximation of the velocity field at each of the altitudes by simulating computational fluid dynamics (CFD) of the wind flow using operating parameters that minimize a cost function of a weighted combination of errors, wherein each error corresponds to one of the altitudes and includes a difference between measured velocities at the measurement points at the corresponding altitude and simulated line-of-sight velocities at the measurement points simulated by the CFD for the corresponding altitude with current values of the operating parameters, wherein the errors include a first error corresponding to a first altitude and a second error corresponding to a second altitude, wherein a weight for the first error in the weighted combination of errors is different from a weight of the second error in the weighted combination of errors;

determine a horizontal derivative of vertical velocity at each of the altitudes from the first approximation of the velocity field at each of the altitudes; and determine a second approximation of the velocity field at each of the altitudes using geometric relationships between a velocity field for each of the altitudes, projections of the measurements of radial velocities on the three-dimensional axes, and the horizontal derivative of vertical velocity for the corresponding velocity field; and an output interface to render the second approximation of velocity fields of the wind flow.

2. The sensing system of claim 1, wherein the weight of each error in the weighted combination of errors is an increasing function of a value of the corresponding altitude.

3. The sensing system of claim 1, wherein the processor determines the first approximation of the velocity fields by performing a set of iterations until a termination condition is met, wherein for each iteration the processor is configured to perform the simulation of the CFD of the wind flow with the current values of operating parameters to reduce a value of the cost function;

determine sensitivities of the value of the cost function determined using the CFD with the current values of operating parameters to variations of values of the operating parameters; and update the operating parameters according the determined sensitivities.

4. The sensing system of claim 3, wherein the processor performs the simulation of the CFD by solving Navier-Stokes equations defining the wind flow with the current values of the operating parameters;

wherein the processor determines the sensitivities of the value of the cost function based on an adjoint model of the CFD using Direct-Adjoint-Looping;

wherein the processor updates the current values of the operating parameters in a direction of maximum decrease of the sensitivities.

5. The sensing system of claim 3, wherein the measurements of the radial velocities are measured by a ground-based LiDAR on a cone, wherein the operating parameters include terrain roughness, inlet velocity, inlet turbulence intensities, and atmospheric stability conditions, wherein the CFD uses a shape of the terrain at the ground-based location of the LiDAR.

6. The sensing system of claim 3, wherein the operating parameters are selected based on sensitivities of the operating parameters to variations of values of the horizontal derivative of vertical velocity.

7. The sensing system of claim 1, wherein, to determine the second approximation of the velocity fields, the processor is configured to determine a biased velocity field under homogeneous velocity assumption of the velocity field for each of the altitudes; and removing a bias of the homogeneous velocity assumption of the biased velocity field for each of the altitudes using the horizontal derivative of vertical velocity for the corresponding altitude.

8. The sensing system of claim 1, wherein the simulation of the CFD of the wind flow is performed by solving Reynolds-averaged Navier-Stokes (RANS) equations.

9. The sensing system of claim 8, wherein internal operating parameters of the RANS equations are determined using a field inversion and machine learning (FIML) with feature vectors including the horizontal derivative of vertical velocity of each of the altitude.

10. The sensing system of claim 1, wherein the measurements of the radial velocities are measured by a ground-based LiDAR on a cone, such that for each altitude, the measurements on the cone are measurements on a circle including multiple measurements of the radial velocities in different angular directions measured at different line-of-site points on a circumference of the circle and one measurement of the radial velocity in a vertical direction measured at a center of the circle.

11. The sensing system of claim 10, wherein the horizontal derivative of vertical velocity at each of the altitudes defines a gradient of the vertical velocity at the center of the circle of the cone defining the measurements of the LiDAR for the corresponding altitude.

12. The sensing system of claim 11, wherein the velocity field for each of the altitudes includes values of the velocity of the wind inside and outside of the cone.

13. The sensing system of claim 1, wherein the second approximation of velocity field includes a single value of the velocity field for each of the altitudes, and wherein the processor transforms the single value into a dense grid of non-constant values of the velocity field at each of the altitudes by enforcing incompressibility and regularization of the wind flow consistent with measurements of radial velocities at each of the altitudes.

14. The sensing system of claim 13, wherein the dense grid of non-constant values of the velocity field is determined using a Direct-Adjoint-Looping.

15. The sensing system of claim 13, further comprising:
a controller to control a wind sensitive system based on the dense grid of non-constant values of the velocity field at each of the altitudes.

16. The sensing system of claim 15, wherein the wind sensitive system is a wind turbine.

17. The sensing system of claim 1, further comprising:
a controller to control a wind sensitive system based on the second approximation of velocity fields of the wind flow.

18. A wind flow sensing method for determining velocity fields of a wind flow at a set of different altitudes from a set of measurements of radial velocities at each of the altitudes, wherein the method uses a processor coupled with stored instructions implementing the method, wherein the instructions, when executed by the processor carry out steps of the method, comprising:

accepting the set of measurements of radial velocities at line-of-site points for each of the altitudes;

determining a first approximation of the velocity field at each of the altitudes by simulating computational fluid dynamics (CFD) of the wind flow with operating parameters reducing a cost function of a weighted combination of errors, each error corresponds to one of the altitudes and includes a difference between measured velocities at the line-of-site points at the corresponding altitude and simulated velocities at the line-of-site points simulated by the CFD for the corresponding altitude with current values of the operating parameters, wherein the errors include a first error corresponding to a first altitude and a second error corresponding to a second altitude, wherein a weight for the first error in the weighted combination of errors is different from a weight of the second error in the weighted combination of errors;

determining a horizontal derivative of vertical velocity at each of the altitudes from the first approximation of the velocity fields;

determining a second approximation of the velocity fields using geometric relationships between a velocity field for each of the altitudes, projections of the measurements of radial velocities on the three-dimensional axes, and the horizontal derivative of vertical velocity for the corresponding velocity field; and rendering the second approximation of velocity fields of the wind flow.

19. The sensing method of claim 18, wherein the first approximation of the velocity fields is determined by performing a set of iterations until a termination condition is met, wherein each iteration includes performing the simulation of the CFD of the wind flow with current values of operating parameters to reduce a value of the cost function;

determining sensitivities of the value of the cost function determined for the CFD with the current values of operating parameters to variations of values of the operating parameters; and updating the operating parameters according the determined sensitivities.

20. A non-transitory computer readable storage medium embodied thereon a program executable by a processor for performing a method for determining velocity fields of a wind flow at a set of different altitudes from a set of measurements of radial velocities at each of the altitudes, the method comprising: accepting the set of measurements of radial velocities at line-of-site points for each of the altitudes;

determining a first approximation of the velocity field at each of the altitudes by simulating computational fluid dynamics (CFD) of the wind flow with operating parameters reducing a cost function of a weighted combination of errors, each error corresponds to one of the altitudes and includes a difference between measured velocities at the line-of-site points at the corresponding altitude and simulated velocities at the line-of-site points simulated by the CFD for the corresponding altitude with current values of the operating parameters, wherein the errors include a first error corresponding to a first altitude and a second error corresponding to a second altitude, wherein a weight for the first error in the weighted combination of errors is different from a weight of the second error in the weighted combination of errors;

determining a horizontal derivative of vertical velocity at each of the altitudes from the first approximation of the velocity fields;

determining a second approximation of the velocity fields using geometric relationships between a velocity field for each of the altitudes, projections of the measurements of radial velocities on the three-dimensional axes, and the horizontal derivative of vertical velocity for the corresponding velocity field; and rendering the second approximation of velocity fields of the wind flow.

* * * * *